(12) United States Patent
Smith

(10) Patent No.: US 7,708,037 B2
(45) Date of Patent: *May 4, 2010

(54) TREE PUSHER

(76) Inventor: Wayne J. Smith, 1064 Noah Trail NW., Brookhaven, MS (US) 39601

( * ) Notice: Subject to any disclaimer, the term of this patent is extended or adjusted under 35 U.S.C. 154(b) by 1208 days.

This patent is subject to a terminal disclaimer.

(21) Appl. No.: 11/164,162

(22) Filed: Nov. 12, 2005

(65) Prior Publication Data
US 2006/0037666 A1 Feb. 23, 2006

Related U.S. Application Data

(63) Continuation-in-part of application No. 10/604,635, filed on Aug. 6, 2003, now Pat. No. 6,968,878, which is a continuation-in-part of application No. 10/064,161, filed on Jun. 17, 2002, now Pat. No. 6,604,562.

(51) Int. Cl.
*A01G 23/08* (2006.01)
(52) U.S. Cl. ..................................... 144/34.2
(58) Field of Classification Search .................. 144/4.1, 144/34.1, 34.2; 254/1, 11, 13, 133 R, 134, 254/133 A
See application file for complete search history.

(56) References Cited
U.S. PATENT DOCUMENTS

| 1,482,846 | A | | 2/1924 | Harrah |
| 2,707,615 | A | * | 5/1955 | Green ......................... 254/100 |
| 2,960,309 | A | * | 11/1960 | Gosta ...................... 254/133 R |
| 3,014,696 | A | * | 12/1961 | Trott ......................... 254/93 R |
| 3,548,899 | A | * | 12/1970 | Emerson ..................... 144/336 |
| 3,778,031 | A | * | 12/1973 | Enander ......................... 254/1 |
| 4,148,462 | A | | 4/1979 | Jessup .................... 254/133 R |
| 4,564,173 | A | | 1/1986 | Atherton et al. ......... 254/133 R |
| 4,660,806 | A | | 4/1987 | Masters ........................ 254/11 |
| 5,735,323 | A | * | 4/1998 | Maloch ..................... 144/34.1 |
| 5,992,824 | A | * | 11/1999 | Voss ........................... 254/2 B |
| 6,135,419 | A | | 10/2000 | Hutson, Jr. et al. .......... 254/2 R |
| 6,604,562 | B1 | * | 8/2003 | Smith ........................ 144/34.2 |
| 6,968,878 | B2 | * | 11/2005 | Smith ........................ 144/34.2 |

* cited by examiner

*Primary Examiner*—Shelley Self
(74) *Attorney, Agent, or Firm*—Reginald F Roberts, Jr.

(57) ABSTRACT

A tree pusher for safely felling a tree. The tree pusher includes (a) a base; (b) a frame mounted on the base; (c) a mechanism for pushing the frame against the tree to fell the tree; and (d) a mechanism for connecting the base of the tree pusher to the tree, so that the base will not move while the tree is being pushed over to fell the tree. The frame includes a detachable pronged head which engages the trunk of the tree, and which disengages itself from the frame of the tree pusher and remains with the trunk of the tree as the tree falls. The frame includes a series of tubes connected end-to-end by locking pins, making it very easy to assemble and disassemble the tree pusher. If a tree has accidentally fallen against a house, a building, or an electrical power line, two tree pushers are positioned on opposite sides of the fallen tree and used to lift the fallen tree.

2 Claims, 26 Drawing Sheets

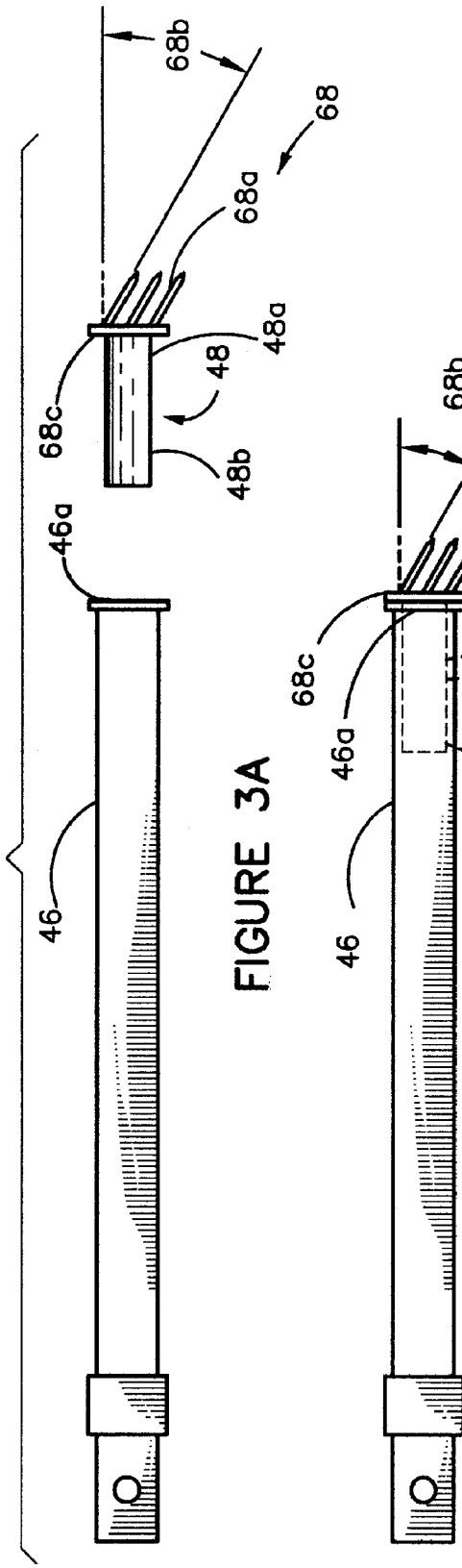
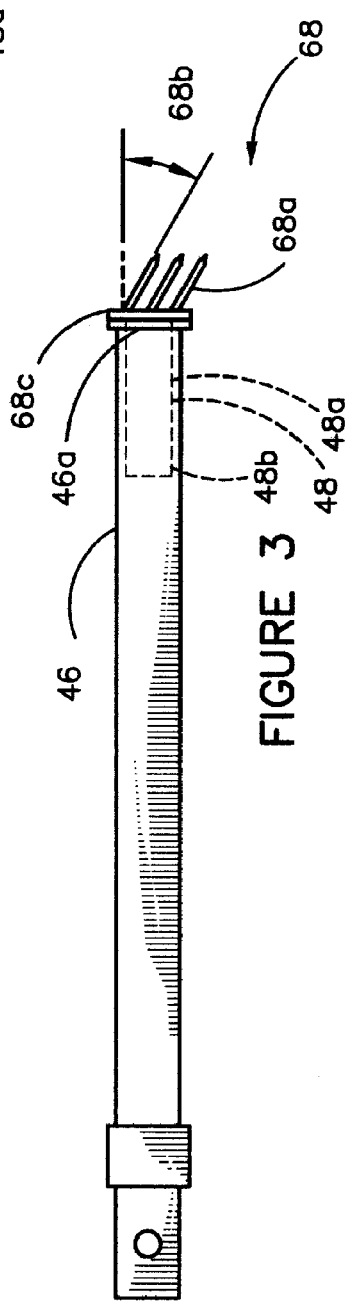
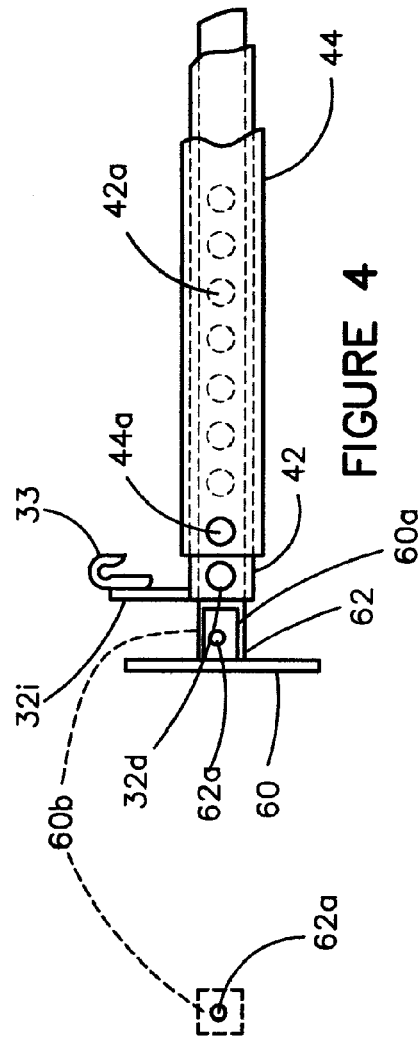
FIGURE 3A
FIGURE 3
FIGURE 4

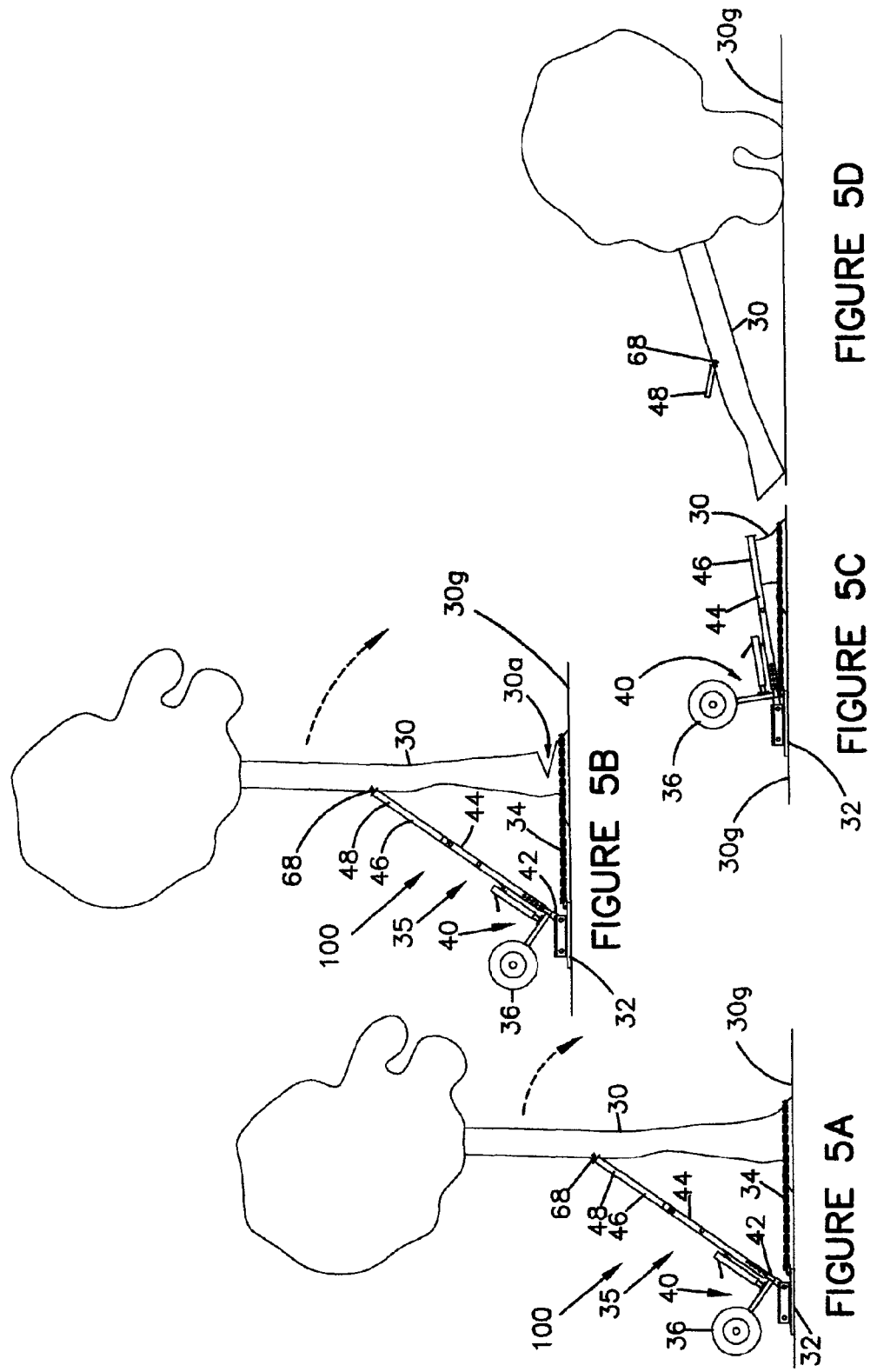

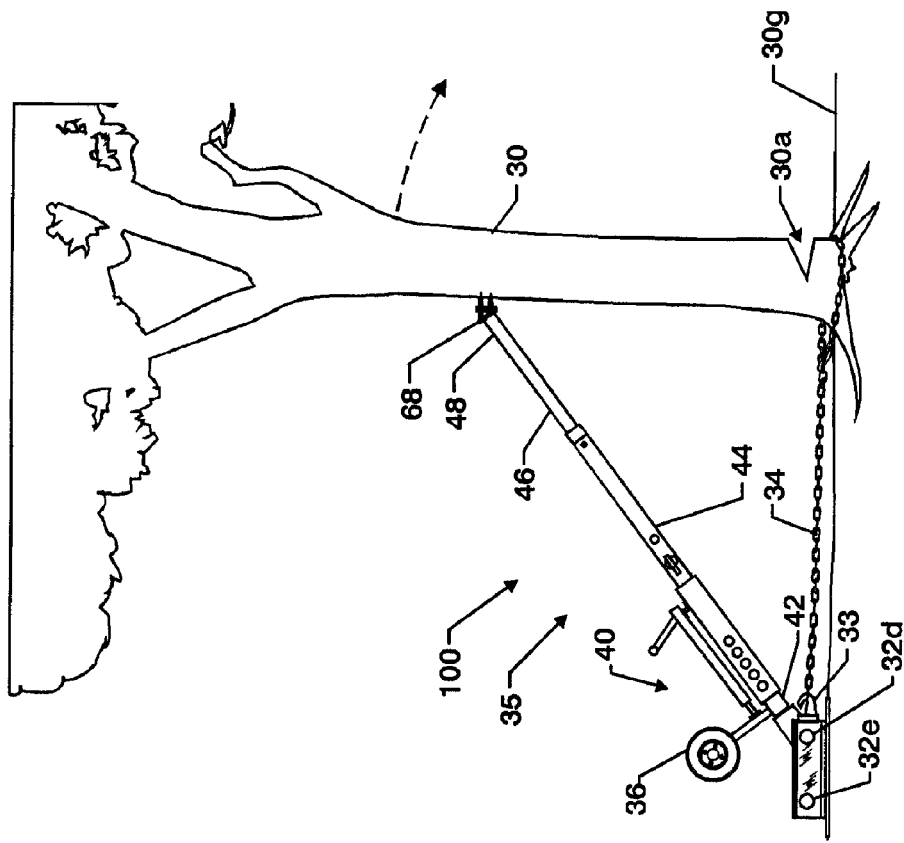
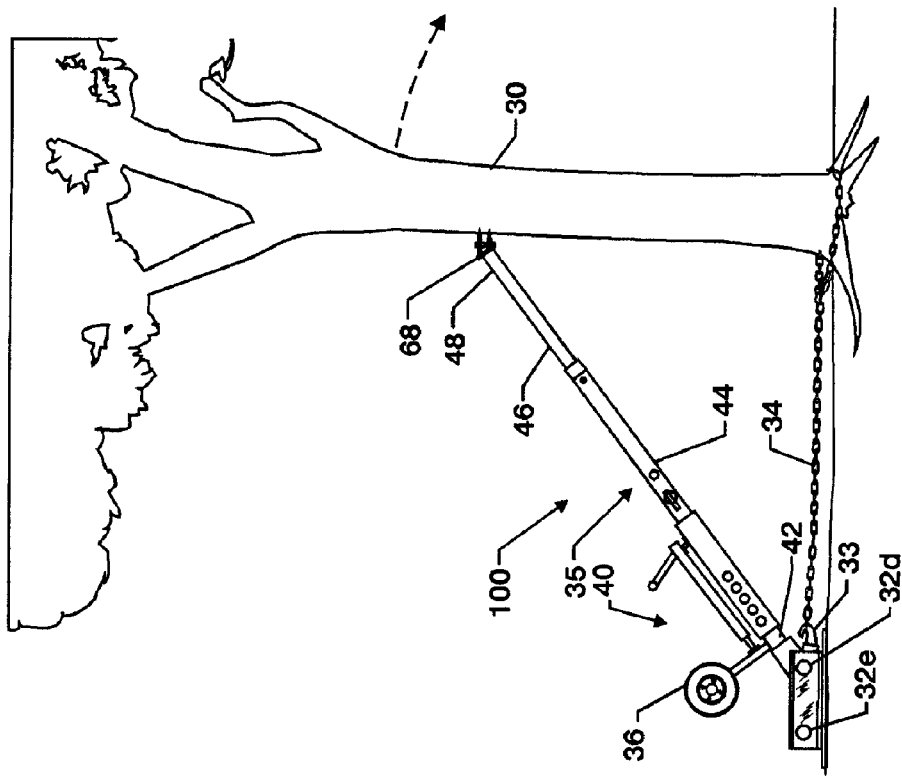

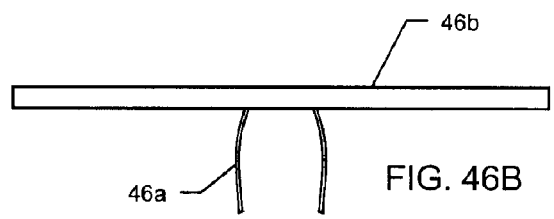
FIG. 46B
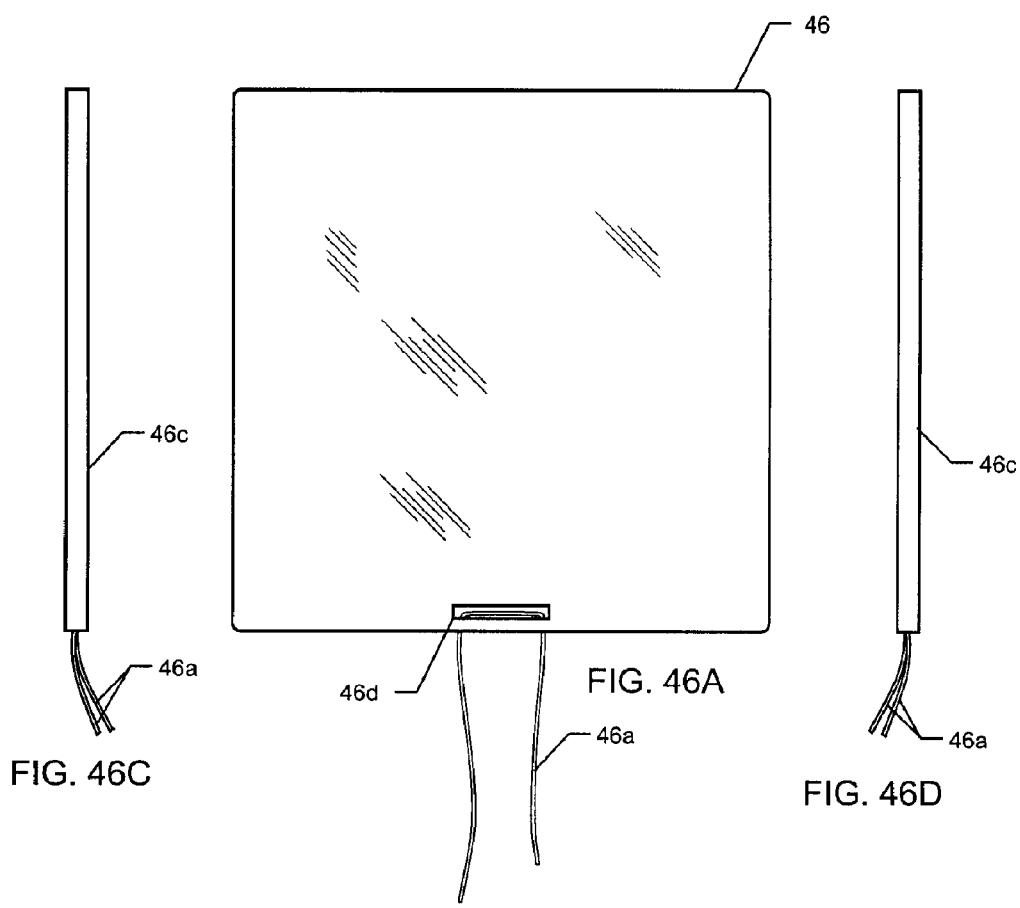
FIG. 46C
FIG. 46A
FIG. 46D
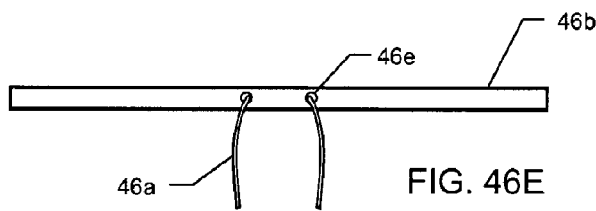
FIG. 46E

TREE PUSHER

CROSS-REFERENCES TO RELATED APPLICATIONS

This application is a continuation-in-part of application Ser. No. 10/604,635, filed Aug. 6, 2003, now U.S. Pat. No. 6,968,878, which is a continuation-in-part of application Ser. No. 10/064,161, filed Jun. 17, 2002, now U.S. Pat. No. 6,604,562.

BACKGROUND OF THE INVENTION

The present invention relates to felling trees. More particularly, the present invention relates to felling trees in a safe and efficient manner by controlling the direction in which the tree falls.

When felling trees, it is a constant problem to determine the direction in which the tree will fall. The problem is especially severe when the tree is leaning in an undesirable direction; e.g., in the direction of a nearby house. When the tree is not leaning in any direction, there is still the problem of preventing the tree from falling on the person or persons who is/are felling the tree. The present invention provides a device and a method for causing the tree to fall in a desired direction.

Attempts have been made to solve these problems, but they have not been successful.

U.S. Pat. No. 4,184,462 to Jessup discloses a tree-felling device adapted to engage a tree being cut down, and to exert a force thereagainst in a particular direction, in order to cause the tree to fall in a selected area. The tree-felling device includes a jacking device of the basic bumper type which is adapted to support an elongated pusher having a tree-engaging head secured at one end thereof, and which is preferably tied to the tree to be cut. As a part of the jacking device, there is provided a ratchet mechanism having an anchoring stud secured thereto for generally receiving and stabilizing one end of said pusher, while the jacking assembly is provided with a support clip about the top portion thereof for holding the pusher.

U.S. Pat. No. 4,564,173 to Atherton et al. discloses an apparatus for pushing a tree over when the tree is being cut down. When a base connected to a bumper jack is placed on a ground surface, the apparatus is tipped at an angle between the ground surface and the tree. A jack handle operates a mechanism to rise along a jack post, causing a support member to push a shaft through an aperture in a guide member until points on a tip member contact the tree, pushing the tree over when the tree is being cut down.

The principal defects of these prior-art inventions are the following:

A bumper jack is not capable of handling the weight of a large tree.

A bumper jack cannot extend its length to a jack post if a longer jack is needed to push the tree over.

The bumper-jack post would bear the entire weight of the tree. If the post should break, the tree could very possibly fall on the person or persons felling the tree, or fall in some other undesirable direction.

If the jack should fail or break under the load, the jack could not be repaired or changed out during the tree-felling operation.

In the case of the Jessup patent, the head plate (36) which engages the tree is not embedded in the wood of the tree. If the tree turns or twists, the head plate will move, slip, or become disconnected from the tree.

Neither device could be used to fell dead or rotten trees, because neither head is designed to engage dead or rotten wood.

In the case of the Jessup patent, there is nothing to hold the head plate (36) up while the tree-felling device is placed in position to fell the tree.

In the case of the Jessup patent, once the tree is lying on the ground, it would be difficult to disconnect and remove the chain (38) from the tree trunk.

In the case of the Jessup patent, there is nothing to prevent the pusher (34) from sliding off the head plate (36) when pressure is applied by the jack.

In the case of the Jessup patent, in the event that the tree twists or turns, there is nothing to hold the pusher (34) against the head plate (36).

The bumper jack lifts the load with a ratcheting action that allows for a rocking motion of the tree. This can cause the wood in the hinge point to break.

Bumper jacks have a large number of moving parts, and have springs which may weaken and break.

Under load, the support plate for the jack would flip or rise up in front, causing the plate to skid or to be pushed backwards.

There is nothing to prevent the jack support plate from being pushed into the ground or away from the tree.

Neither tree-felling device is usable on hard surfaces.

The tree-felling devices could not be used on banks or inclines.

There is no effective way of transporting the tree-felling devices to the job site.

There is no mechanism to hold the base of the tree pusher in place as the tree pusher is pushed against the tree.

The present invention provides an effective solution to these and other problems described along with a detailed description of the invention.

SUMMARY OF THE INVENTION

In general, the present invention in a first aspect provides a tree pusher for safely felling trees.

A first embodiment of the tree pusher comprises (a) a base; (b) a frame mounted on the base, (c) means for urging the frame against the tree; and (d) means for connecting the base of the tree pusher to the tree, for immobilizing the base while the tree is being felled.

A second embodiment of the tree pusher comprises (a) a base extension; (b) an extension tube, mounted on the base extension; (c) a base, mounted on the extension tube; (d) a frame, mounted on the base; and (e) means for urging the frame against the tree.

A third embodiment of the tree pusher comprises
a detachable pronged head, for engaging a tree;
a first tube connected to the head;
a second tube connected to the first tube;
a jack connected to the second tube;
a base on which the jack is mounted, and to which the jack is fastened; and
(f) means for connecting the base of the tree pusher to the tree, for immobilizing the base while the tree is being felled.

A fourth embodiment of the tree pusher comprises
a detachable pronged head, for engaging a tree;
a tube connected to the head;
a jack connected to the tube;
a base on which the jack is mounted, and to which the jack is fastened; and (e) means for connecting the base of the tree pusher to the tree, for immobilizing the base while the tree is being felled.

A fifth embodiment of the tree pusher comprises a detachable pronged head, for engaging a tree;

a jack connected to the detachable head;

a base on which the jack is mounted, and to which the jack is fastened; and means for connecting the base of the tree pusher to the base of a second tree pusher, for stabilizing and immobilizing the base of the tree pusher.

A sixth embodiment of the tree pusher comprises a plurality of tubes having first and second ends, the tubes being connected end-to-end, a second end of a first tube being disposed in and attached to a first end of a second tube by a locking pin disposed in openings near the second end of the first tube and the first end of the second tube;

means for urging the tree pusher against a tree to be felled; and means for attaching the tree pusher to the tree to be felled.

A seventh embodiment of the tree pusher comprises a base;

a concave receptacle, mounted on the base, the concave receptacle being constructed and arranged for pivotal and rotatable connection thereto of a jack, for urging the tree pusher against a trunk of a tree to be felled;

a spherical member, disposed in the concave receptacle, for pivotally and rotatably connecting the jack to the base;

a pronged head, constructed and arranged to engage the trunk of the tree to be felled; and (f) a head adapter, connecting the head to the jack.

An eighth embodiment of the tree pusher comprises a pronged head, for engaging a trunk of a tree to be felled;

a first tube connected to the head;

a second tube connected to the first tube;

a jack connected to the second tube;

a base;

a concave receptacle, mounted on the base, the concave receptacle being constructed and arranged for pivotal and rotatable connection of the jack to the base; and (g) a spherical member, disposed in the concave receptacle, for pivotally and rotatably connecting the jack to the base.

A ninth embodiment of the tree pusher comprises a pronged head, for engaging a trunk of a tree to be felled;

a tube connected to the head;

a jack connected to the tube a base a concave receptacle, mounted on the base, the concave receptacle being constructed and arranged for pivotable and rotatable connection of the jack to the base; and (f) a spherical member, disposed in the concave receptacle, for pivotally and rotatably connecting the jack to the base.

In a second aspect, the invention provides a mechanism for connecting a base of a tree pusher to a trunk of a tree.

A first embodiment of the mechanism comprises a hook attached to the base; and (b) a chain for connecting the hook to the trunk of the tree.

A second embodiment of the mechanism comprises a jack, mounted on the base;

a hook attached to the jack; and (c) a chain for connecting the hook to the trunk of the tree.

In a third aspect, the invention provides a device to be used when felling small, hollow, and/or rotten trees. The device comprises a flexible member constructed and arranged to be wrapped around a trunk of the tree and secured thereto a short distance above a cut in the trunk of the tree to be felled;

a first buckle for securing the flexible member to the trunk of the tree; and a second buckle for adjusting the effective length of the flexible member and of the device.

In a fourth aspect, the invention provides a detachable pronged head for a tree pusher. The head comprises a shank, a plurality of prongs for engaging a trunk of a tree, and a triangular plate connecting the prongs to the shank, each prong and the shank defining therebetween an angle having a magnitude of from about fifteen to about thirty degrees, each prong having a lower side including two faces which form a knife edge and which define therebetwen an exterior angle, the faces tapering from wide to narrow in a direction away from the triangular plate to form a pointed end of the prong.

In a fifth aspect, the present invention provides a method for lifting a tree that has fallen and is leaning against a house, a building, or an electrical power line. The method comprises providing first and second tree pushers, each tree pusher including a base and a jack mounted on and connected to the base;

disposing the first and second tree pushers perpendicular to one another, on opposite sides of the tree;

connecting the bases of the first and second tree pushers to each other, to stabilize and immobilize the bases; and using the jacks to lift the fallen tree.

BRIEF DESCRIPTION OF THE DRAWINGS

FIGS. 3 and 3A are enlarged schematic representations of a portion of the tree pusher shown in FIGS. 1 and 2.

FIG. 4 is a schematic representation of a modified portion of the tree pusher shown in FIGS. 1 and 2.

FIGS. 5A-F are schematic representations of various stages of felling a tree, using the tree pusher shown in FIGS. 1 and 2.

FIGS. 46A-46E are schematic representations of components of a device to be used when felling trees situated on soft terrain.

DETAILED DESCRIPTION OF THE INVENTION

Figure 1:
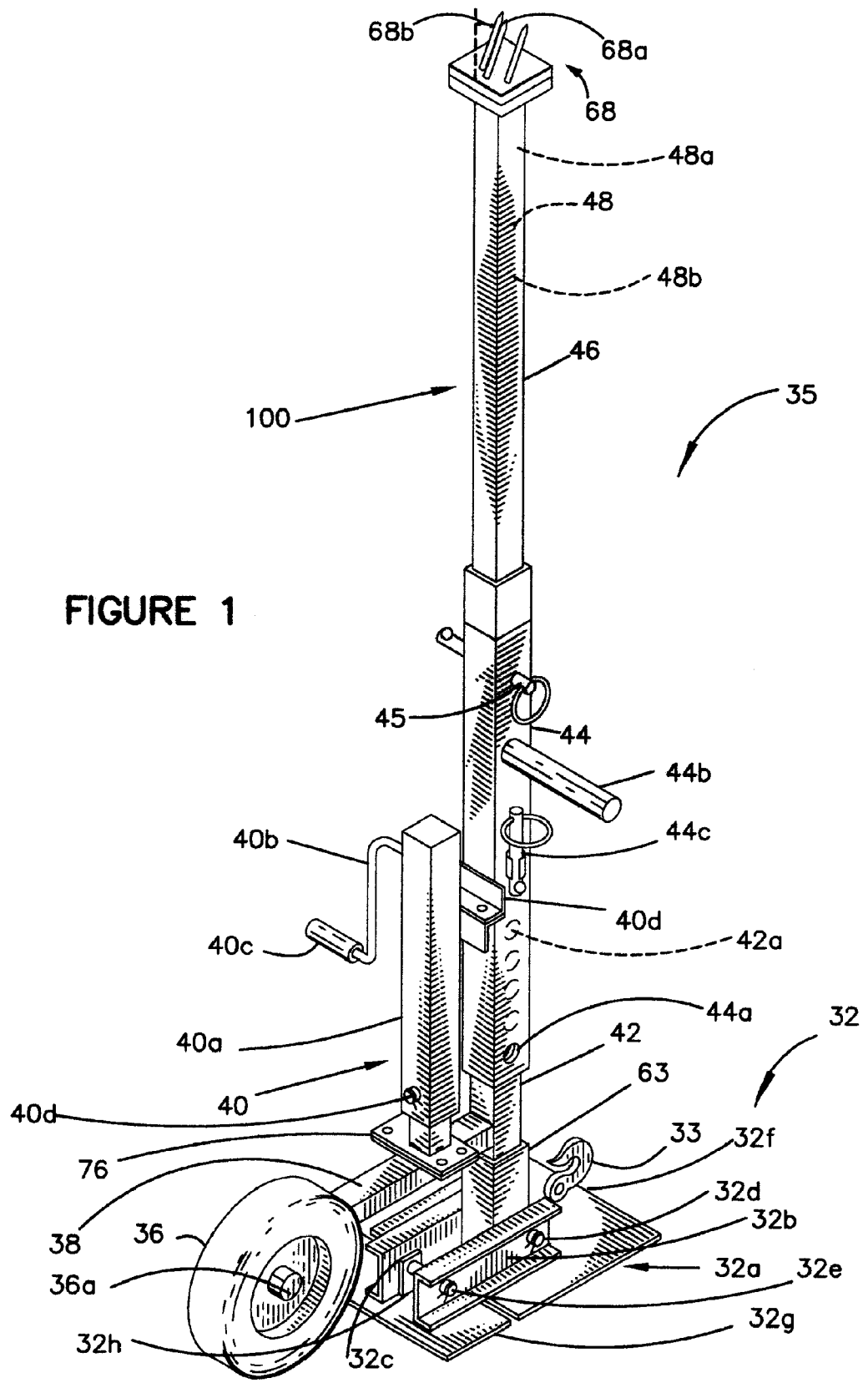
FIG. 1 is an isometric side elevation of a first embodiment of a tree pusher, made in accordance with the principles of the present invention.
Figure 2:
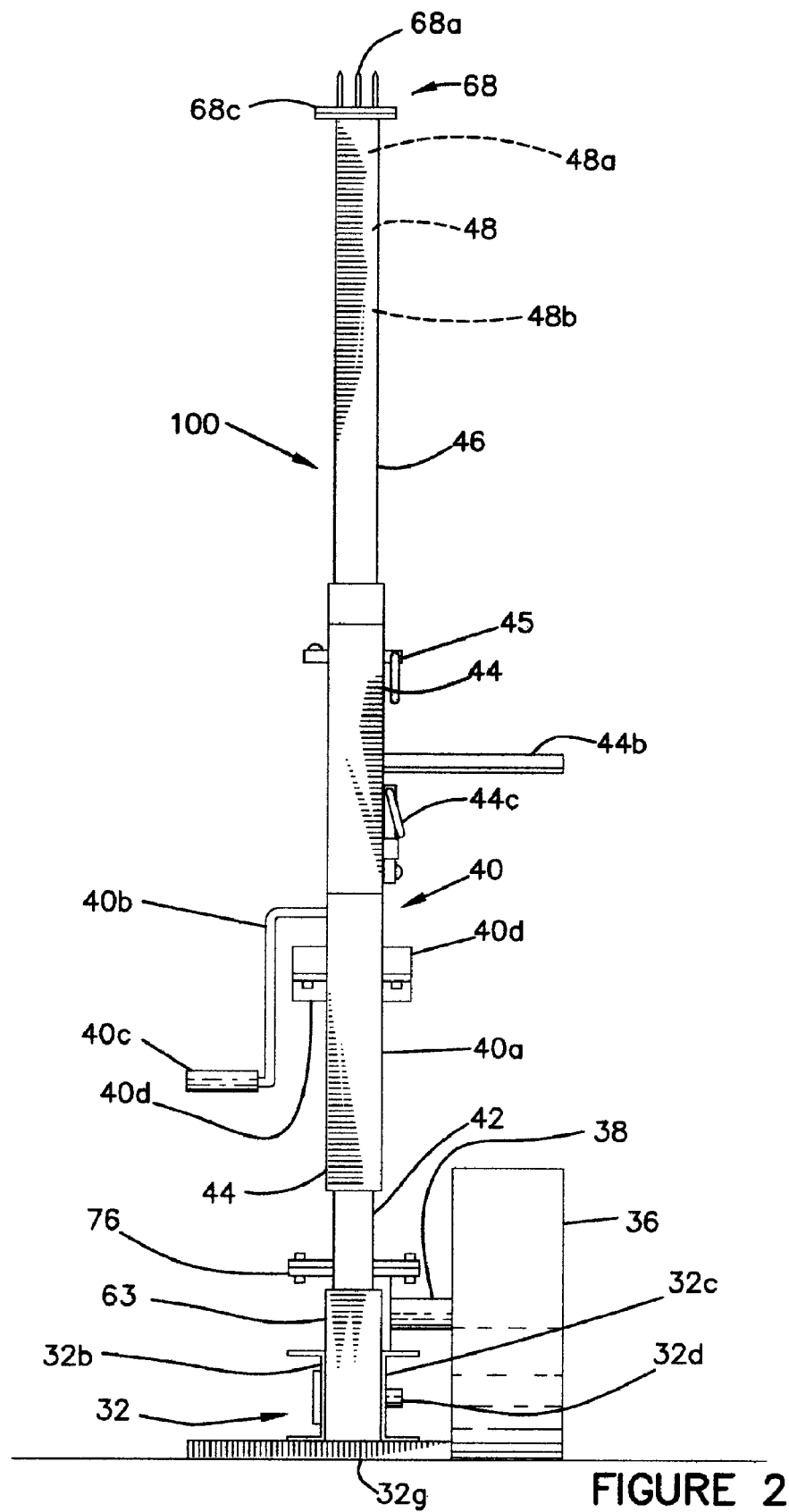
FIG. 2 is an isometric rear view of the tree pusher shown in FIG. 1.

More specifically, reference is made to FIGS. 1 and 2, in which is shown a first embodiment of a tree pusher, made in accordance with the principles of the present invention, and generally designated by the numeral 100.

The tree pusher 100 comprises a base 32, a frame 35, a detachable pronged head 68 which engages a tree, a screw-type propeller trailer jack 40 for urging the frame 35 and head 68 against the tree, and a wheel 36 for moving the tree pusher 100.

The base 32 comprises a split plate 32a having first and second portions 32f and 32g. First and second parallel channel irons 32b and 32c are spaced apart from one another and fastened to the first portion 32f of the split plate 32a in a perpendicular orientation. A hook 33 is fastened to the first portion 32f of the split plate 32a, for attachment of a chain to the hook 33 and thereby to the base 32.

A pair of parallel plates 32h having openings therein are spaced apart and fastened to the second portion 32g of the split plate 32a. The plates 32h are identical to those shown in FIG. 8A at 65a with openings 65b. Only one of the plates 32h is shown in FIG. 1, and the opening in plate 32h is not shown in that drawing.

The frame 35 comprises first, second, third, and fourth rectangular tubes 63, 42, 44, and 46, respectively. The first tube 63 is disposed between first ends of the channel irons 32b and 32c and pivotally connected thereto by a first pin 32d. The first ends of the channel irons 32b and 32c are fastened to one another and pivotally connected to the first rectangular tube 63 by the first pin 32d. Second ends of the channel irons 32b and 32c are fastened to one another by a second pin 32e, thereby fastening the first and second portions 32f and 32g of the split plate 32a to one another.

The second tube 42 is disposed in the first tube 63. The third tube 44 is constructed and arranged to slide over the second tube 42. The fourth tube 46 is constructed and arranged to be inserted in and pinned to the third tube 44 by a third pin 45.

As will be seen most clearly in FIGS. 3A and 3, the pronged head 68 comprises a cylindrical fifth tube 48 having first and second ends 48a and 48b, and a plurality of prongs 68a fastened to a cap 68c at the first end 48a of the fifth tube 48. The fifth tube 48 and each prong 68a define therebetween an angle 68b of from about fifteen to about thirty degrees. The fourth tube 46 is provided with a flange 46a upon which the cap 68c rests when the fifth tube 48 is disposed as shown in the fourth tube 46.

Referring again to FIGS. 1 and 2, the jack 40 comprises a jack base 76 fastened to the second tube 42 by a shaft 38; a body 40a mounted on the jack base 76, fastened to the third tube 44 by a union 40d, and constructed and arranged for movement parallel to the frame 35 of the tree pusher 100; and a crank 40b having a handle 40c, for moving the body 40a of the jack 40.

The wheel 36 is mounted on an axle 36a, which is in turn mounted on the shaft 38 to which the jack base 76 is fastened.

The third tube 44 includes an opening 44a, and a handle 44b for moving the tree pusher 100. A pin 44c is disposed in the opening 44a to lock the second and third tubes 42 and 44 to one another, in order that the body 40a of the jack 40 can be extended, to provide and extended range for the jack 40, and to provide a means for removing the jack 40 from the frame 35 in the event the jack 40 should break or fail.

The jack 40 is extendable, capable of bearing the weight of a large tree, and capable of being removed, repaired, or changed out under load during a tree-felling operation.

The jack 40 has fifteen inches of movement or extension. When this point has been reached, one would insert pin 44c in opening 44a to lock the second and third tubes 42 and 44 together, thus holding the weight of the tree on the frame 35 of the tree pusher. Then one would pull out the jack pin 40d, and screw the jack 40 back down to start there, by pulling the jack base 76 out to gain another thirteen inches of travel or push in the tree pusher 100. When the jack 40 has been screwed back down to the bottom or starting point, one would reinsert the jack pin 40d in the jack body 40a, thereby locking the jack body 40a in the jack 40. Then one would start to screw the jack 40 again to push the tree, at which time one would remove pin 44c from opening 44a, thus allowing the jack 40 to push the tree for an added thirteen inches of push if needed.

Reference is now made to FIG. 4, in which is shown a modification of the base 32 shown in FIGS. 1 and 2. The modified base comprises first and second plates 60 and 32i. The second plate 32i is fastened to the second tube 42, preferably by welding. First and second parallel plates 60a and 60b are spaced apart and fastened perpendicularly to the first plate 60. Instead of the first rectangular tube 63 shown in FIGS. 1 and 2, a first rectangular tube 62 is disposed between the first and second parallel plates 60a and 60b, and the plates 60a, 60b, and the first tube 62 are fastened to one another by a pin 62a. The first tube 62 is pivotally attached to the first and second parallel plates 60a and 60b and to the first plate 60, and extends through the second and third tubes 42 and 44. The modified base provides a modest degree of elevation for the tree pusher when used on unlevel ground that is slightly below the ground level of a tree to be cut down. A tree standing on ground below the level of ground on which the tree pusher rests presents no problem; one simply ends up with a tall stump after the tree has been cut down.

Reference is now made to FIGS. 5A to 5E, which illustrate a method for felling a tree in accordance with the principles of the present invention.

FIGS. 5A and 5E show the pronged head 68 of the tree pusher 100 engaging a tree 30 which is to be felled. The tree 30 and the tree pusher 100 are on substantially level ground 30g. The base 32 is connected to the tree 30 by a chain 34 attached to the hook 33 (not shown) of the base 32. The person (not shown) operating the tree pusher 100 has oriented the tree pusher 100 by pivoting the frame 35 on the base 32 so that the tree 30 will fall in the direction indicated by the arrow when force is applied to the tree 30 by the jack 40.

As shown in FIGS. 5B and 5F, after the tree 30 has been engaged by the tree pusher 100, a V-shaped notch 30a is cut in the trunk of the tree 30 on the side of the tree 30 opposite that of the tree pusher 100, and above the point of attachment of the chain 34. Cutting the notch 30a in the trunk of the tree 30 prepares the tree for felling and reinforces the action of the tree pusher 100 in causing the tree 30 to fall in the chosen and desired direction.

The head 68 remains attached to the trunk of the tree 30 as the tree 30 falls, leaving a stump of the tree 30, as shown in FIGS. 5C and 5D.

Figure 6:
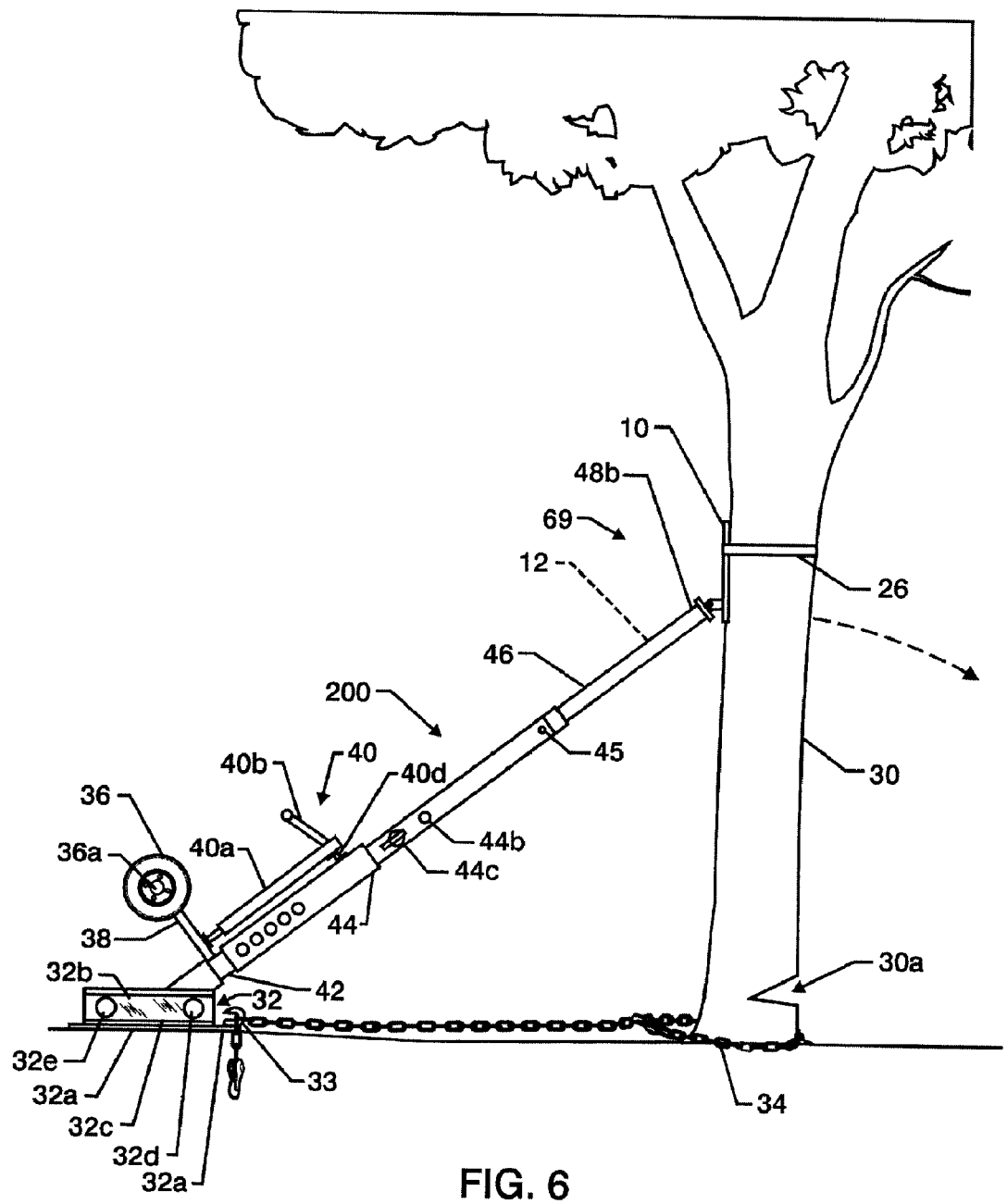
FIGS. 6 and 6A are isometric side elevations of a second embodiment of a tree pusher made in accordance with the principles of the present invention, the tree pusher engaging a tree that is to be felled.
Figure 6A:
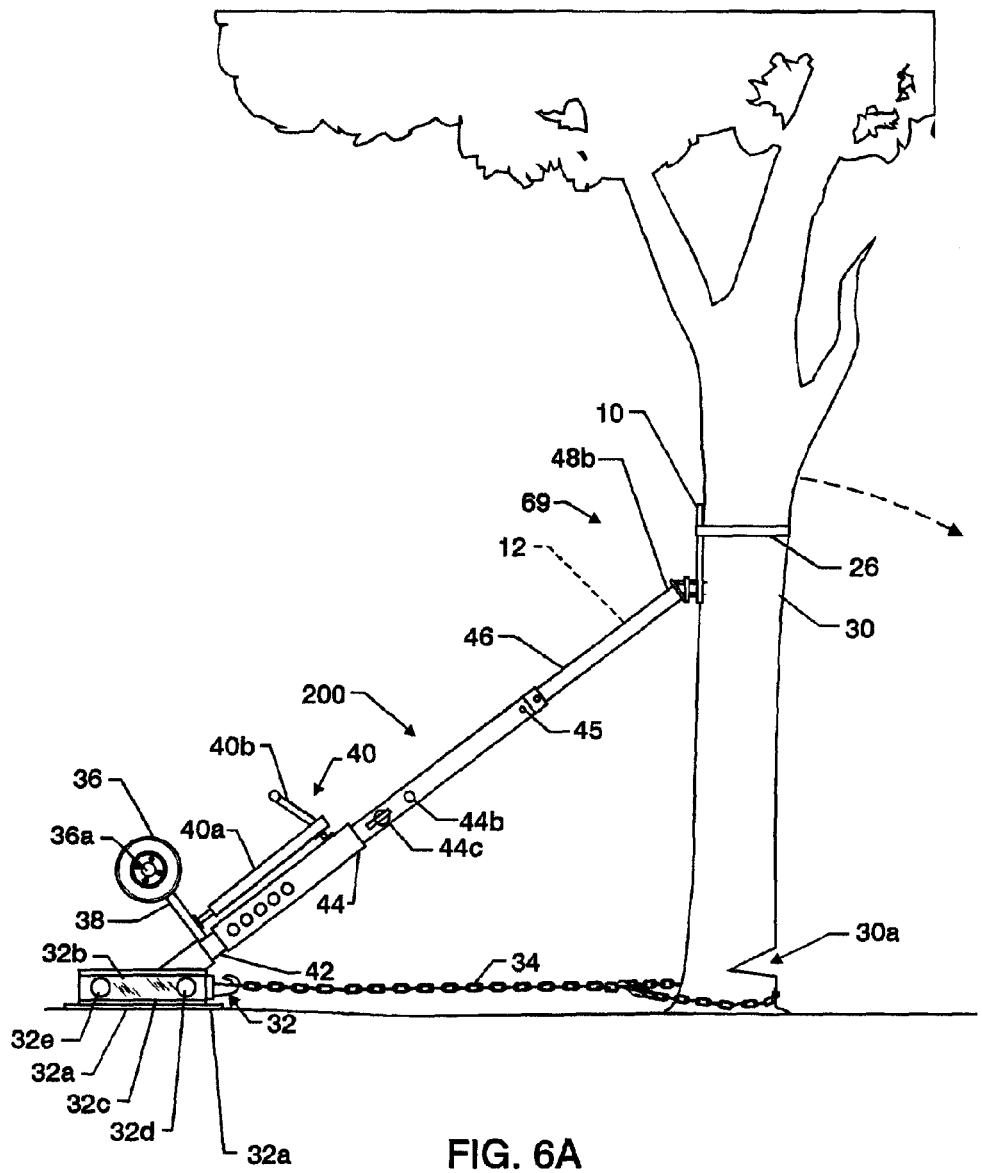

Reference is now made to FIGS. 6 and 6A, in which are shown a second embodiment of a tree pusher, made in accordance with the principles of the present invention, and generally designated by the numeral 200. The second embodiment 200 differs from the first embodiment 100 of the tree pusher only in the construction of the wrap-around head 69.

The pronged head 68 is used when the wood of the trunk is reasonably solid. The wrap-around head 69 is used only when the wood is rotten or for some other reason cannot be securely engaged by the prongs 68a of the pronged head 68.

Figure 7A:
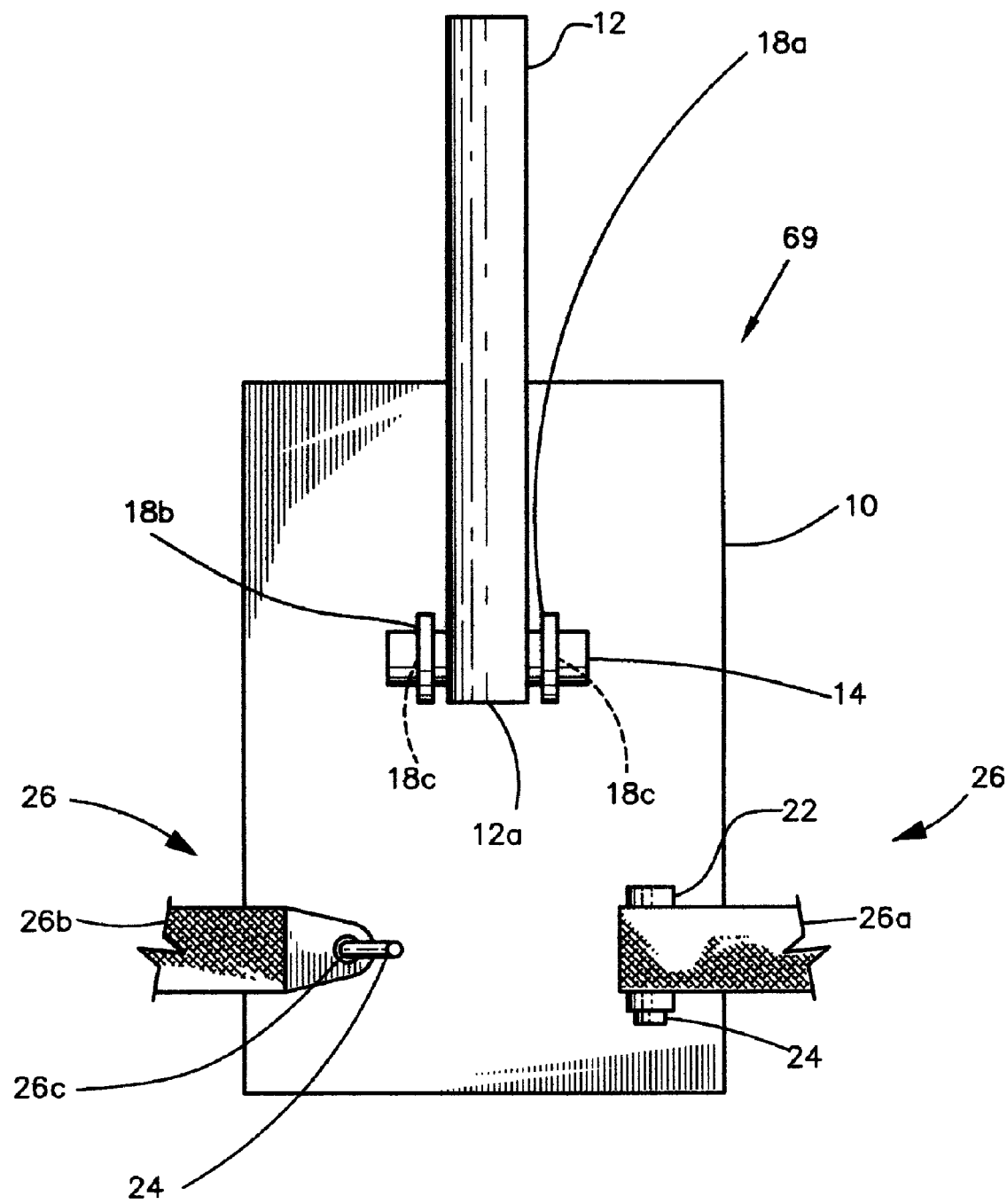
FIGS. 7A and 7B are enlarged schematic representations of opposite faces of a portion of the tree pusher shown in FIG. 6.
Figure 7B:
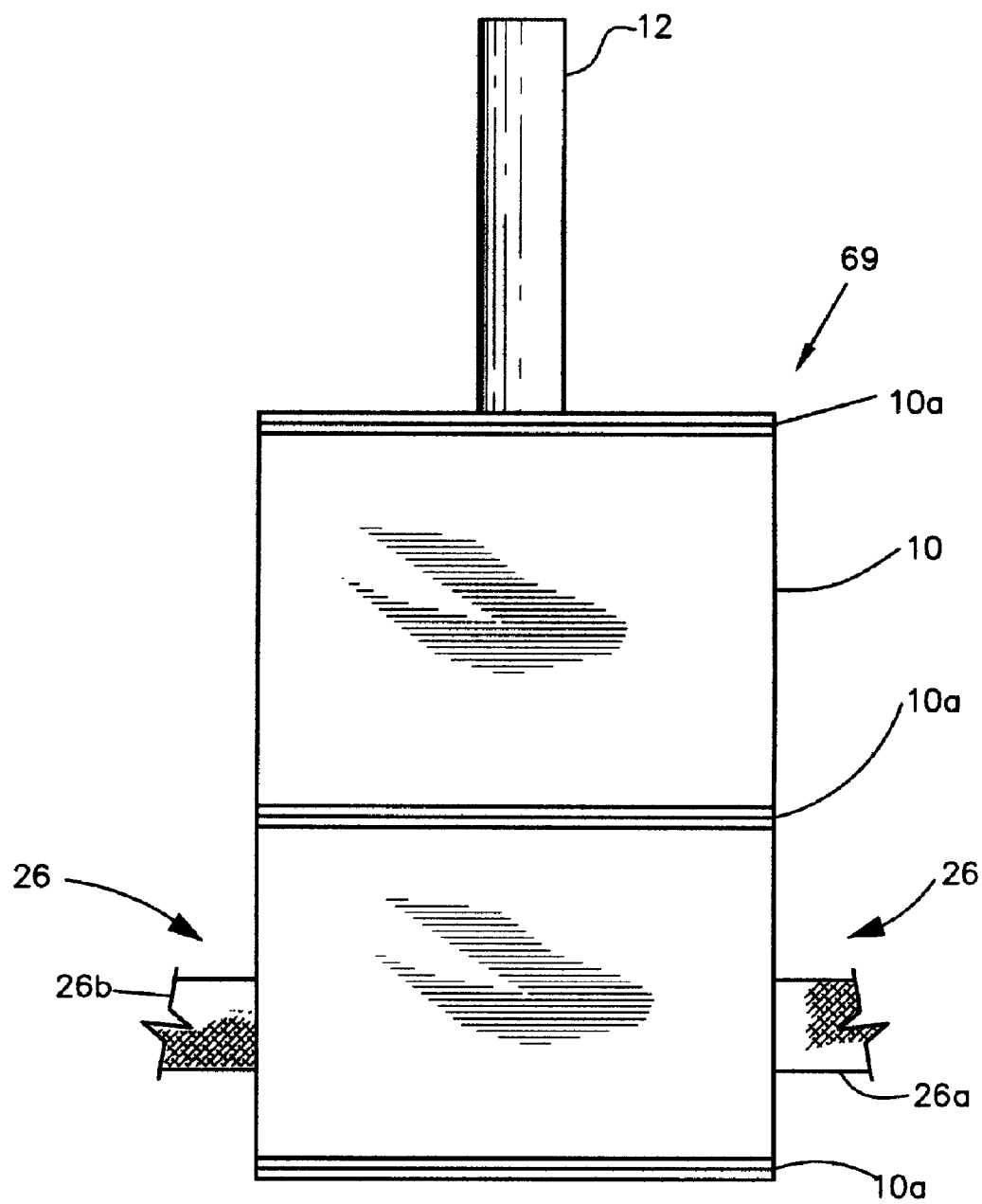

The structure of the wrap-around head 69 can be best understood by reference to FIGS. 7A and 7B, which show opposite faces of the head 69. The wrap-around head 69 is constructed and arranged to be wrapped around the trunk of a tree.

FIG. 7A shows a first face of the head 69. The first face comprises first, second, and third plates 10, 18a, and 18b. The second and third plates 18a and 18b are spaced apart, and are fastened to a first face of the first plate in a perpendicular orientation. The second and third plates 18a and 18b each includes a substantially central opening 18c.

A cylindrical tube 12 has an end 12a pivotally attached to the second and third plates 18a and 18b by a bolt 14 disposed in the central openings 18c. The rest of the tube 12 is disposed in tube 46, as shown in FIG. 6. A ratchet binder 22 and a hook 24 are fastened to opposite sides of the first face of the first plate 10. A Nylon strap 26 has a first end 26a connected to the ratchet binder 22, and a second end 26b connected to the hook 24 through an eye 26c.

FIG. 7B shows a second and opposite face of the wrap-around head 69. A plurality of teeth 10a fastened to a second and opposite face of the first plate 10 penetrate and embed themselves in the dead wood of the tree trunk and, in combination with the strap 26 which is wrapped around the tree trunk, hold the tree pusher 200 firmly and securely to the trunk of the tree 30.

Figure 8:
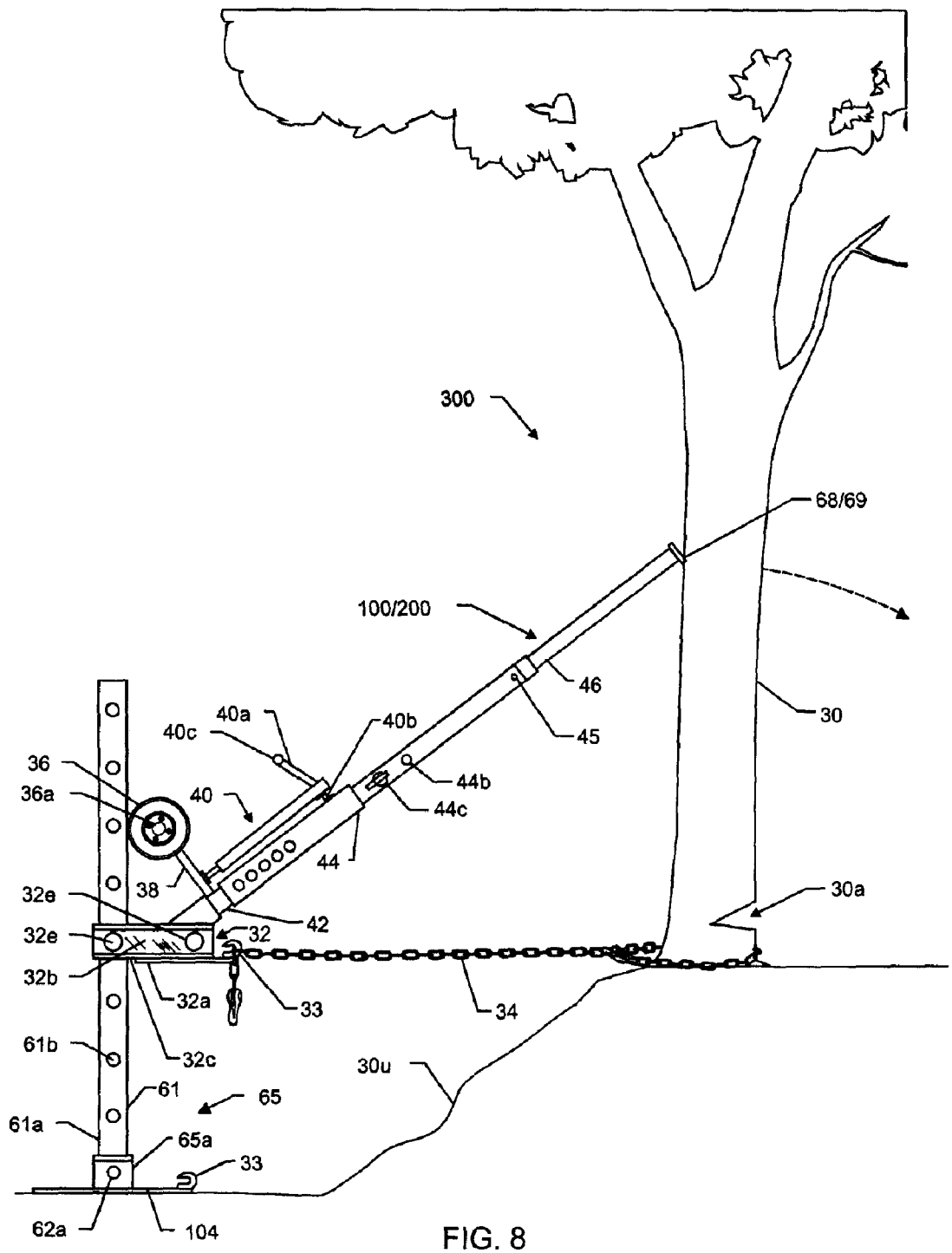
FIG. 8 is an isometric side elevation of a third embodiment of a tree pusher made in accordance with the principles of the present invention, the tree pusher engaging a tree that is to be felled.
Figure 8A:
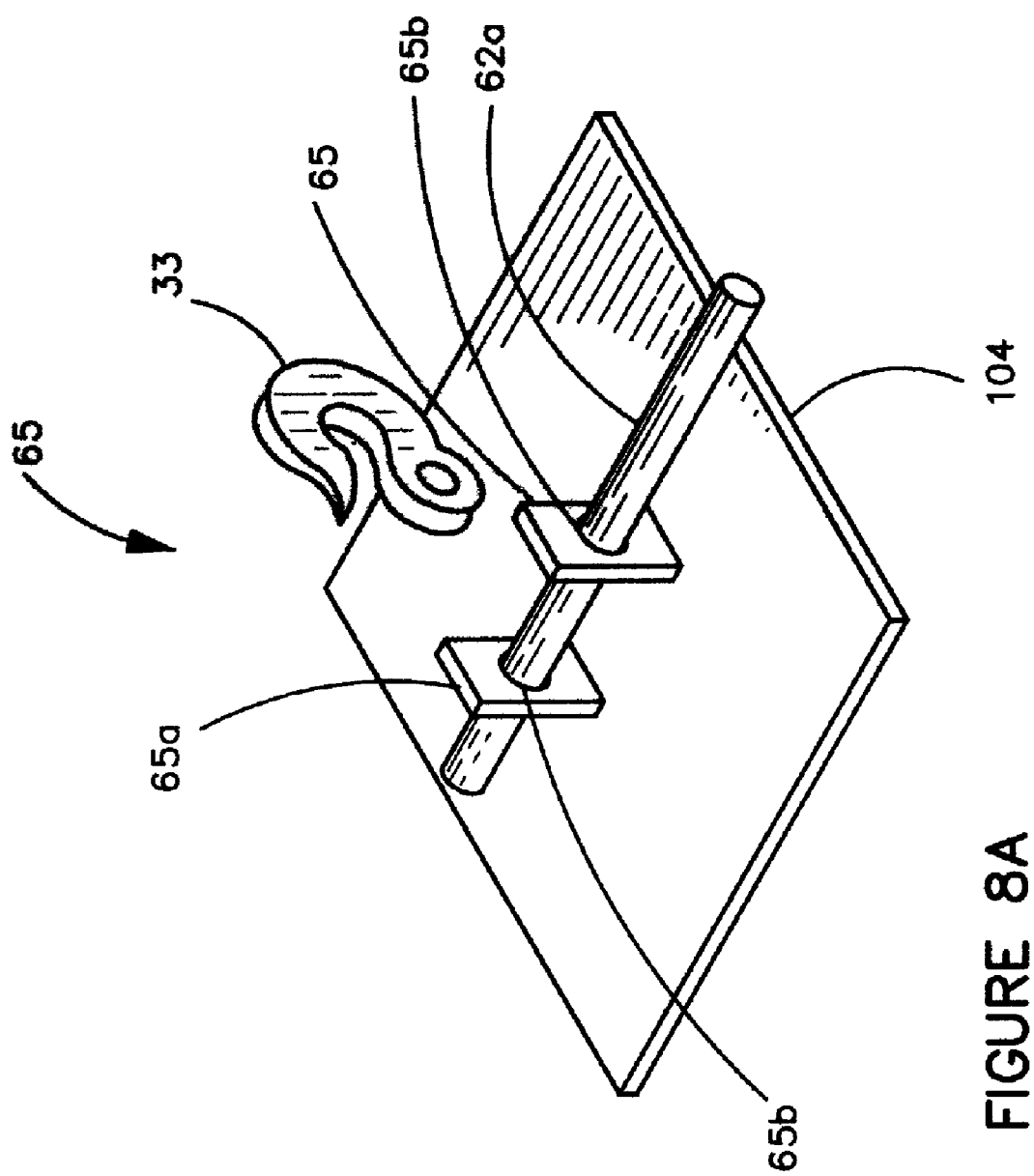
FIG. 8A is an enlarged isometric view of a portion of the tree pusher shown in FIG. 8.

Reference is now made to FIG. 8, in which is shown a third embodiment of a tree pusher, made in accordance with the principles of the present invention, and generally designated by the numeral 300. This embodiment of the tree pusher is used on unlevel ground that is substantially below the level of a tree to be cut down.

A base extension 65 (shown in FIG. 8A) comprises a first plate 104 to which are fastened in a perpendicular orientation a pair of parallel second plates 65a spaced apart and having openings 65b. A rectangular tube 61 has an end 61a disposed between the plates 65a. The tube 61 includes a plurality of openings 61b along its length. One of the openings 61b is at the end 61a of the tube 61, and is used to lock the tube 61 to the plates 65a and thereby to the base 65, by inserting a locking pin 62a in and through the openings 63b and 61b.

The base 32 shown in FIGS. 1 and 2 is mounted on the tube 61 and the base extension 65 by inserting and locking the pin 32e in one of the other openings 61b. By appropriate choice of the specific opening 61b, the base 32 and the tree pusher 100/200, signifying either embodiment 100 or 200, can be raised to the appropriate height to engage and fell the tree 30. The head 68/69 may be either the pronged head 68 or the wrap-around head 69.

Attachment of the hook 33 to the plate 104 provides a modified base that can be used to replace the base 32 of the first and second embodiments 100 and 200 when the tree pusher is to be used on substantially level ground.

It is critically important that both heads 68 and 69 be detachable from the frame 35, and that they remain attached to the tree trunk as the tree falls. For this reason it is critical that the tubes 48 and 12 be cylindrical, not rectangular. A cylindrical tube can freely rotate in the tube 46 as the tree falls; a rectangular tube would bind. Detachability of the heads 68 and 69 is a very important advantage of the present invention over the prior art.

The construction of the pronged head 68 of the tree pusher is critical because in order to attach itself to the tree, the head 68 must embed itself and remain embedded in the wood of the tree. Otherwise, the bark of pine and hardwood trees will break, and the head 68 will come loose and slide off the trunk of the tree. With the head 68 constructed as shown, having prongs 68a which define an angle 68b of from about fifteen to about thirty degrees with the fifth tube 48, the pronged head 68 will remain in contact with the tree 30 as the tree is pushed over the center of gravity of the tree to the point where the tree will fall. The center of gravity of a tree that is leaning e.g. ten degrees with limbs on the side toward which the tree is leaning is not in line with the trunk, but somewhere out on the limbs. A tree with this type of lean has to be pushed far over center before the tree will fall. The angle 68b of the prongs 68a keeps the pronged head 68 in contact with the trunk until and as the tree falls.

For trees that are twisted or crooked, the pronged head 68 must embed and remain embedded in the wood, because the tree will twist or move while being felled. The head 68 must remain embedded in the wood, and must be able to turn in the frame of the tree pusher so as not to lose contact with the tree, or move the frame of the tree pusher during the felling operation. The head 68 cannot be fastened or remain attached to the frame of the tree pusher, because if the tree twisted or turned, the head 68 would twist or turn the frame of the tree pusher, causing loss of control of the tree-pushing operation. As constructed, the pronged head 68 will turn or twist with the movement of the tree, and not move or twist the frame of the tree pusher.

As constructed and arranged, the heads 68 and 69 will detach from the frame of the tree pusher and stay with the falling tree, leaving the rest of the tree pusher safe and unmoved, after which the head 68 or 69 can and would be removed and recovered from the trunk of the fallen tree, to be reused in future operations.

Prior-art tree pushers do not have this important feature. Consequently, either the head will pull out of the tree and remain with the frame as the tree falls, or the entire tree pusher will be pulled over along with the falling tree. In the former case, control of the operation will be lost; in the latter, a very dangerous situation will be created, which could possibly cause serious injury to personnel and/or major damage to the tree pusher.

A second improvement over the prior art is the use of a screw-type trailer jack which is extendable, which is capable of handling the weight of a large tree, and which can be repaired or changed out under load during the tree-felling operation.

A third improvement is the securing of the tree pusher to the base of the tree by a chain or equivalent means. This enables the tree pusher to be used in and on any type of terrain including hard surfaces, and to maintain the tree pusher steady in the desired location while the operation is in progress. Tying the base of the tree pusher to the base of the tree which becomes a stump enables easy removal of the chain therefrom after the tree has been cut down.

A fourth advantage is the capability of transporting the tree pusher to the job site, made possible by the wheel 36.

A fifth advantage is the capability of using the tree pusher on unlevel ground or terrain.

Whether attached to the base 32, as shown in FIGS. 5A-5D and 6, or to the jack 40, as shown in FIGS. 5E, 5F, and 6A, it is critical that the base 32 be immobilized by connecting the base 32 directly or indirectly to the tree 30. Otherwise, the base will move as the tree is pushed and as the tree falls, creating an unstable and unsafe situation. These observations apply also and equally to embodiments 300, shown in FIG. 8, and to the embodiment shown in FIG. 4.

Figure 9:
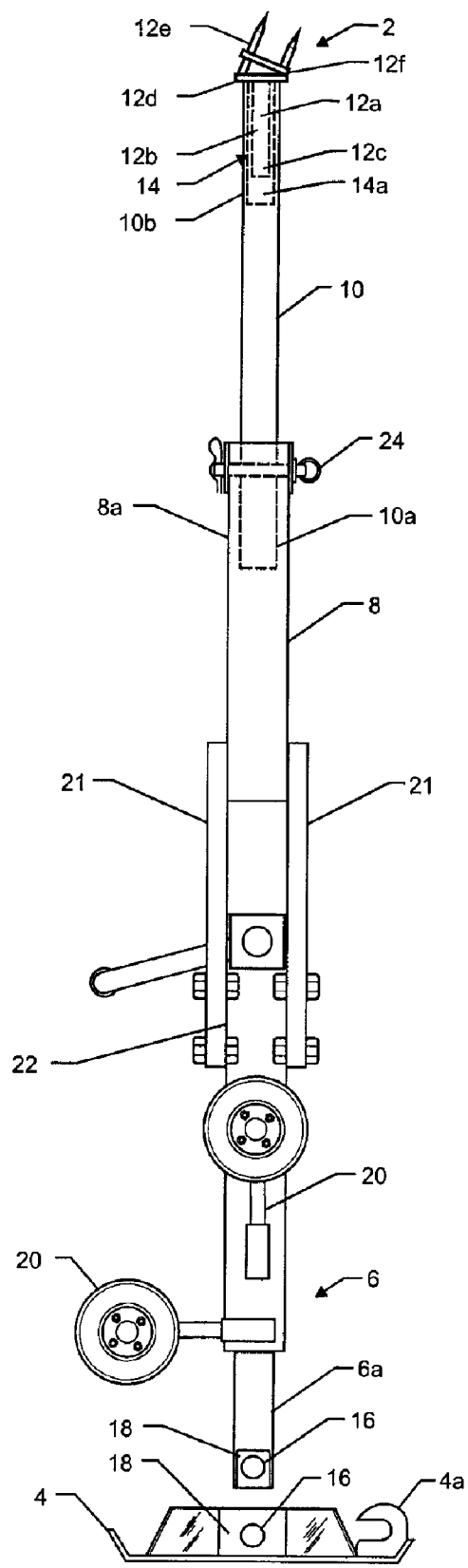
FIG. 9 is an isometric view, partly exploded, of a fourth embodiment of a tree pusher, made in accordance with the principles of the present invention.

Reference is now made to FIG. 9, in which is shown a second embodiment of a tree pusher made in accordance with the principles of the present invention, and generally designated by the numeral 2.

The tree pusher 2 comprises a base 4, a screw-type propeller jack 6, a first tube 8, a second tube 10, a detachable head 12, and a base 14 for the detachable head 12.

The base 4 includes a hook 4a to engage a chain (not shown) used to secure the tree pusher to a tree being felled. The leg 6a of the jack 6 is pivotally connected to the base 4 by a pin 16, and by a pair of plates 18 which strengthen the area around the pin 16. A wheel 20 is pivotally mounted on the jack leg 6a, and can be readily converted from a position for moving the tree pusher 2 into a stored or retracted position.

The first tube 8 is connected to the jack 6 by two flat pieces 21, and is bolted to the jack 6 by a pair of plates 22 which include openings 22a for bolts (not shown). The plates 22 are welded to the jack 6 and to the flat pieces 21.

The second tube 10 has one end 10a disposed in one end 8a of the first tube 8. The ends 8a and 10a of the first and second tubes 8 and 10 are pinned to one another by a pin 24.

Disposed in the other end 10b of the second tube 10 are the detachable head 12 and the base 14 for the attachable head 12.

The structures of the head 12 and base 14 are more clearly shown in FIGS. 10-13, to which reference is now made.

The detachable head 12 (FIGS. 10 and 11) comprises a tube or bar 12a having first and second ends 12b and 12c. The first end 12b of the tube or bar 12a is fastened to a first plate 12d.

A plurality of prongs 12e are fastened to the first plate 12d. Preferably, a second plate 12f is fastened transversely to the prongs 12e, to brace the prongs 12e. The tube or bar 12a and each prong 12e define therebetween an angle 12g of from about fifteen to about thirty degrees.

Figure 13:
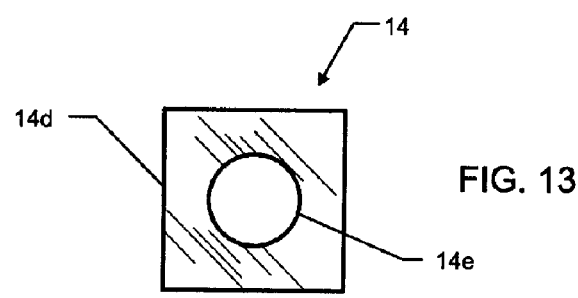
FIG. 13 is a front view of the base for the detachable head shown in FIG. 12.

The base 14 (FIGS. 12 and 13) for the detachable head 12 comprises a tube 14a having first and second ends 14b and 14c, and a third plate 14d fastened to the first end 14b of the third plate 14a. As seen in FIG. 13, the third plate 14d includes an opening 14e.

The detachable head 12 is constructed and arranged so that the bar or tube 12a is disposable in the tube 14a of the base 14 when the bar or tube 12a is inserted through the opening 14e of the third plate 14d. The tube 14a serves as a sleeve, and the third plate 14d as a collar for the bar or tube 12a.

Reference is again made to FIG. 9, in which is shown the head 12 and base 14 for the head 12 disposed in the second tube 10 of the tree pusher 2. The first and second tubes 8 and 10 may be made of square/rectangular or circular/cylindrical tubing; the tube or bar 12a and the tube 14a must be circular/cylindrical, to prevent binding. Likewise, the opening 14e must be circular, in conformity with the tube or bar 12a.

It is critically important that the head 12 remains attached to the tree trunk as the tree falls. For this reason it is critical that the tube or bar 12a, the tube 14a, and the opening 14e be circular/cylindrical, not square or rectangular. A cylindrical tube or bar can freely rotate in the tube 14a and in the opening 14e of the tube 14a as the tree falls; a rectangular tube would bind. Detachability of the head 12 is an extremely important aspect of the present invention, and an extremely important advantage of the invention over the prior art.

Figure 10:
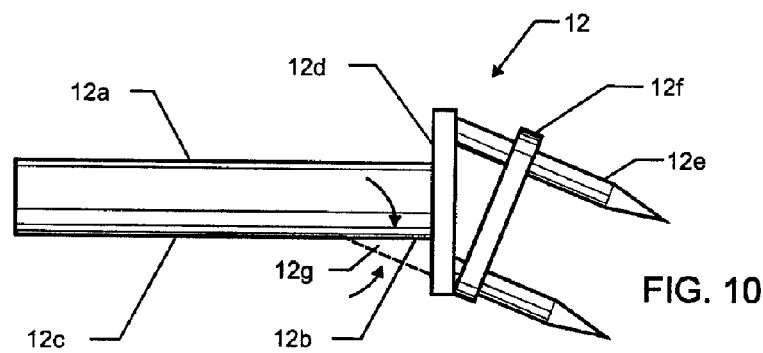
FIG. 10 is a side view of a detachable head for a tree pusher, made in accordance with the principles of the present invention.
Figure 11:
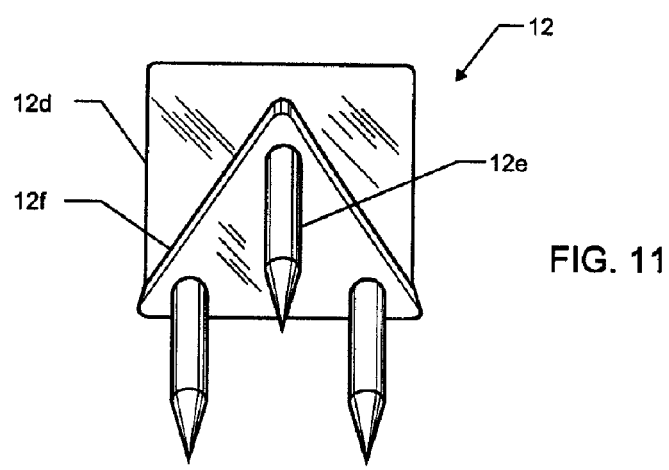
FIG. 11 is a front view of the detachable head shown in FIG. 10.
Figure 12:
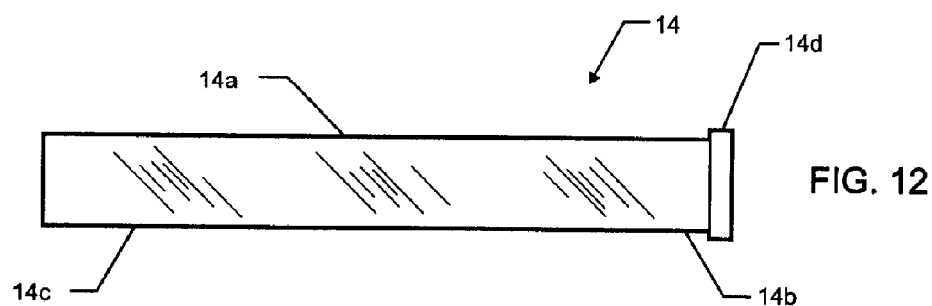
FIG. 12 is a side view of a base for the detachable head shown in FIGS. 10 and 11.

The construction of the detachable head 12 of the tree pusher 2 is critical. In order to attach itself to the tree, the head 12 must embed itself and remain embedded in the wood of the tree. Otherwise, the bark of pine and hardwood trees will break, and the head 12 will come loose and slide off the trunk of the tree. With the head 12 constructed as shown in FIGS. 10 and 11, having prongs 12e which define an angle 12g of from about five to about thirty degrees with the tube or bar 12a, the head 12 will remain in contact with the tree as the tree is pushed over its center of gravity to the point where the tree will fall. The center of gravity of a tree that is leaning e.g. ten degrees, with limbs on the side toward which the tree is leaning, is not in line with the trunk, but is somewhere out on the limbs. A tree with this type of lean has to be pushed far over center before the tree will fall. The angle 12g of the prongs 12e keeps the head 12 in contact with the trunk until and as the tree falls.

For trees that are twisted or crooked, the head 12 must embed and remain embedded in the wood, because the tree will twist or move while being felled. The prongs 12e of the head 12 must remain embedded in the wood, and the head 12 must be able to turn in the tube 14a so as not to lose contact with the tree, or to move the tree pusher 2 during the felling operation. The head 12 cannot be fastened or remain attached to the rest of the tree pusher 2, because if the tree twisted or turned, the head 12 would twist or turn the tree pusher 2, causing loss of control of the tree-pushing operation. As constructed, the pronged head 12 will turn or twist with the movement of the tree, and will not move or twist the tree pusher 2. The head 12 will detach from the remainder of the tree pusher 2 and stay with the falling tree, leaving the rest of the tree pusher 2 safe and unmoved. The head 12 is then removed and recovered from the trunk of the fallen tree, and reused in future operations.

Prior-art tree pushers do not have this important feature. Consequently, either the head will pull out of the tree and remain with the frame of the tree pusher as the tree falls, or the entire tree pusher will be pulled over along with the falling tree. In the former case, control of the operation will be lost; in the latter, a very dangerous situation will be created—a situation which could cause serious injury to personnel and/or major damage to the tree pusher.

Figure 14:
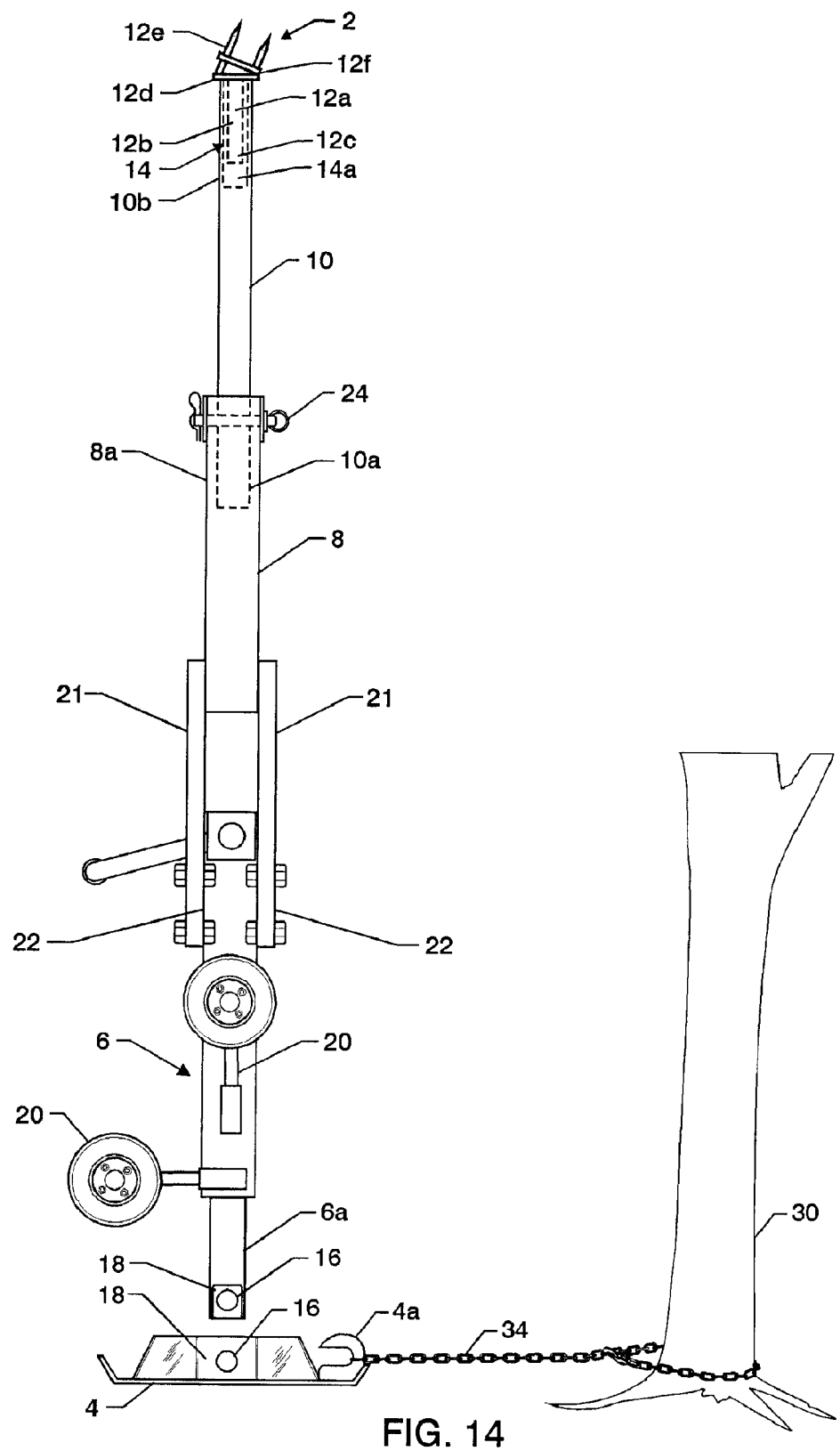
FIGS. 14 and 15 are isometric side elevations of the fourth embodiment of the tree pusher engaging a tree to be felled.

Reference is now made to FIG. 14, in which is shown the base 4 of the tree pusher 2 chained to the tree 30. In the absence of such an arrangement, the base 4 of the tree pusher 2 would move as the tree pusher 2 is urged against the tree 30.

Figure 15:
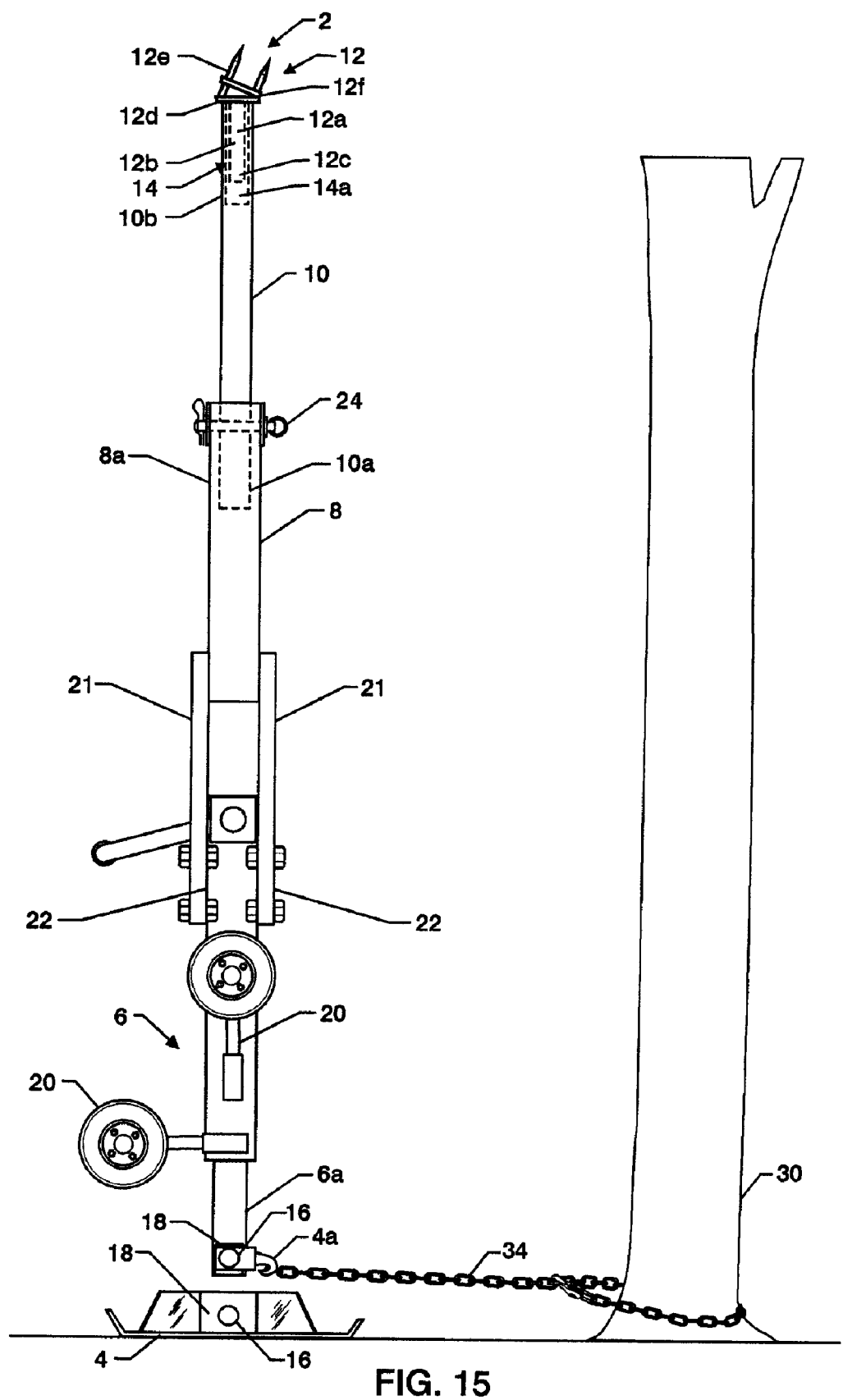

Reference is now made to FIG. 15, in which is shown the jack 6 of the tree pusher 2 chained to the tree 30. In the absence of such an arrangement, shown here and in FIG. 14, the base 4 of the tree pusher 2 would move as the tree pusher 2 is urged against the tree 30.

Figure 16:
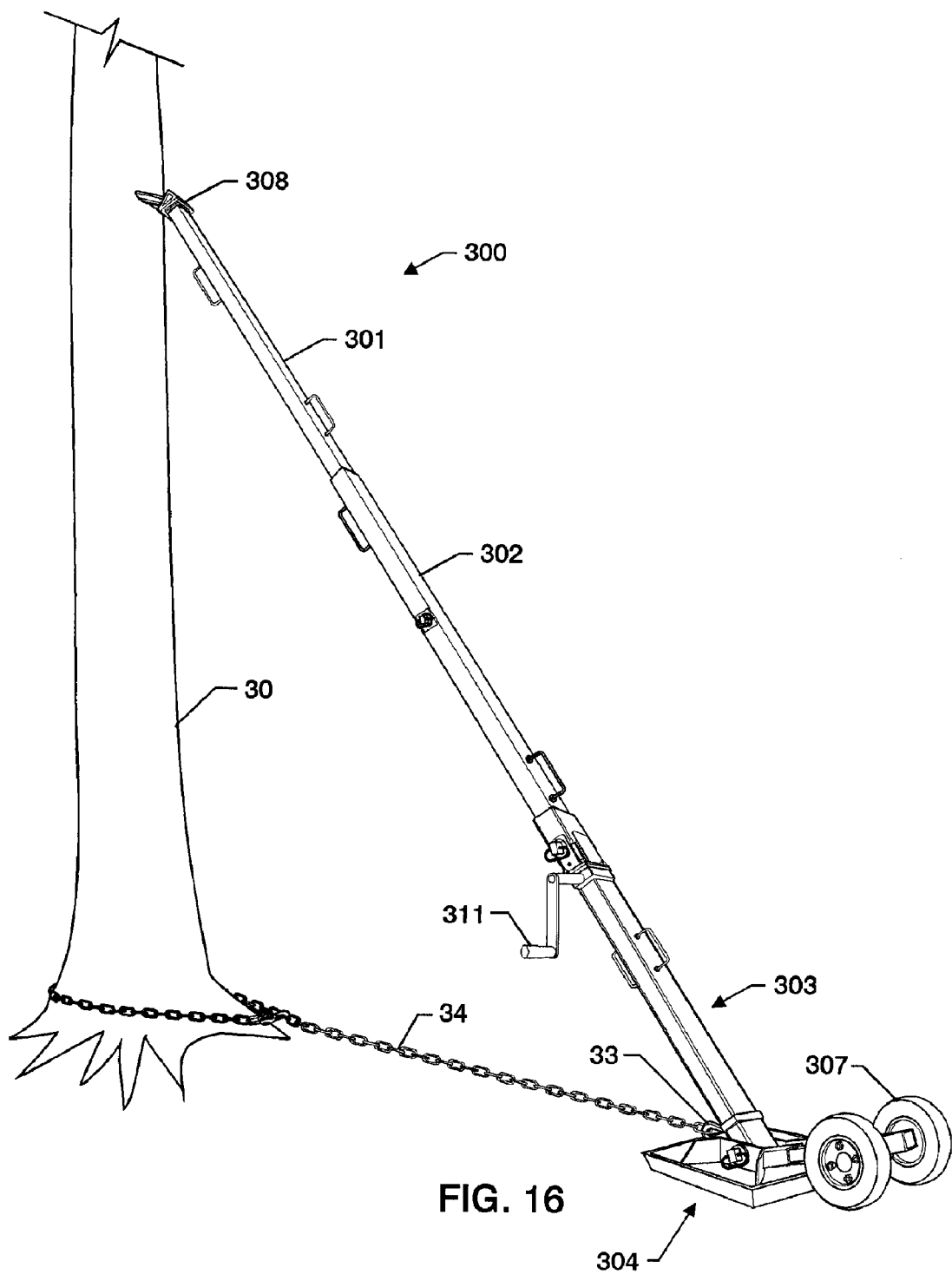
FIG. 16 is an isometric side elevation of a fifth embodiment of a tree pusher, made in accordance with the principles of the present invention, engaging a tree to be felled.

Reference is now made to FIG. 16, in which is shown a preferred fifth embodiment of a tree pusher, made in accordance with the principles of the present invention, and generally designated by the numeral 300, engaging a tree 30 that is to be felled.

The tree pusher 300 comprises a detachable pronged head 308, shown as engaging the tree 30; a first tube 301 connected to the head 308; a second tube 302 connected to the first tube 301; a jack 303 connected to the second tube 302, the jack 303 being provided with a handle 311 for manual operation; a base 304 on which the jack 303 is mounted and to which the jack 303 is fastened; and a pair of wheels 307 connected to the base 304.

The base 304 includes a hook 33. The tree 30 is connected to the base 304 of the tree pusher 300 by a chain 34 disposed in the hook 33. In the absence of such a connection of the tree 30 to the base 304 of the tree pusher 300, the base 304 would be unstable and would move when the tree pusher 300 is urged against the tree 30 by the jack 303.

Figure 17:
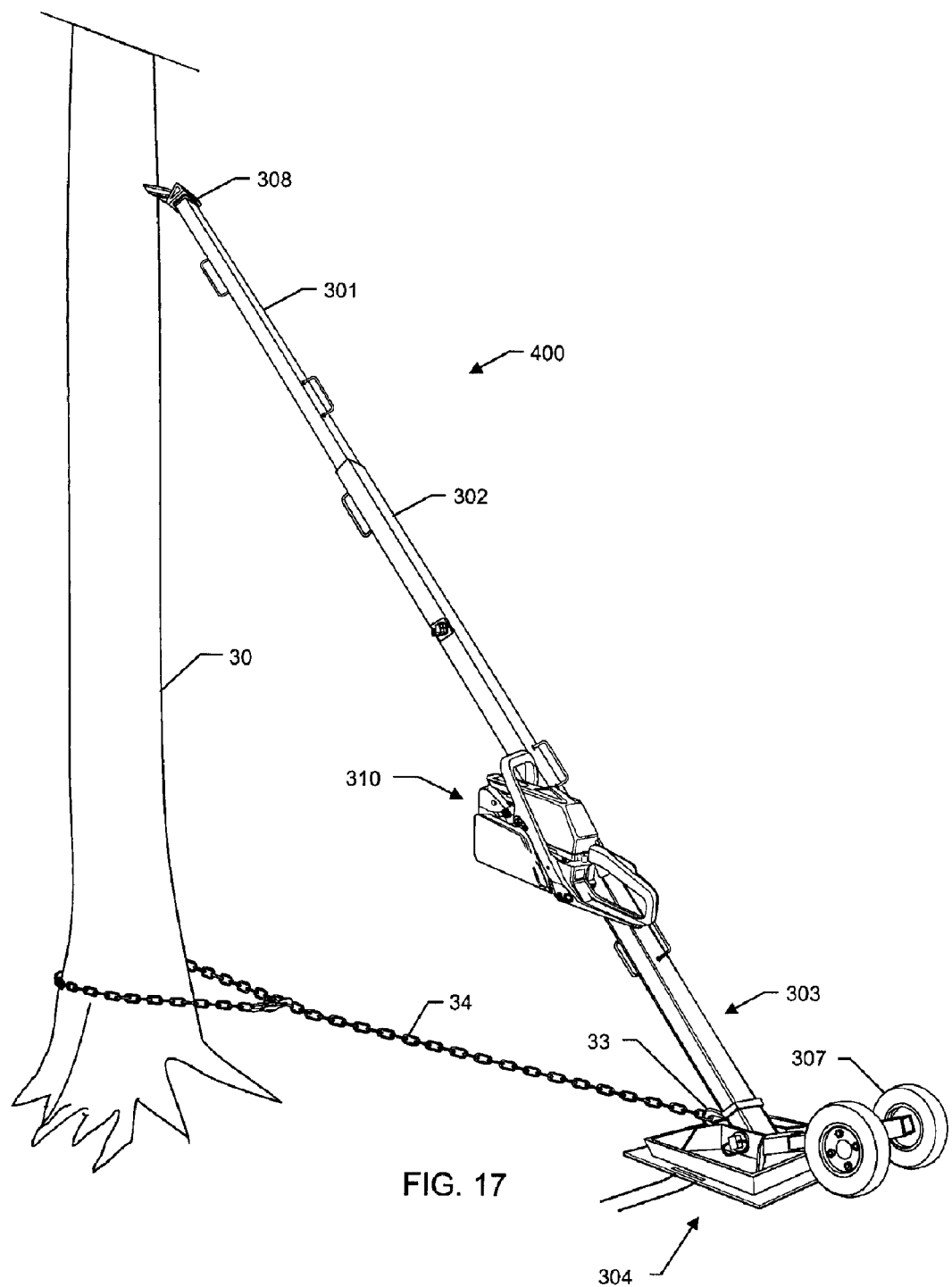
FIG. 17 is an isometric side elevation of a sixth embodiment of a tree pusher, made in accordance with the principles of the present invention, engaging a tree to be felled.

Reference is now made to FIG. 17, in which is shown a preferred sixth embodiment of a tree pusher, made in accordance with the principles of the present invention, and generally designated by the numeral 400, engaging a tree 30 that is to be felled.

The only difference between the fifth and sixth embodiments 300 and 400 of the tree pusher is that the sixth embodiment 400 includes a power head and gear box 310 for powered operation of the jack 303. As in the case of the fifth embodiment 300, shown in FIG. 16, the sixth embodiment 400 is shown in FIG. 17 with the base 304 of the tree pusher 400 chained to the tree 30, to provide stability and immovability to and of the base 304 when the tree pusher 400 is urged against the tree 30 by the jack 303.

Figure 18:
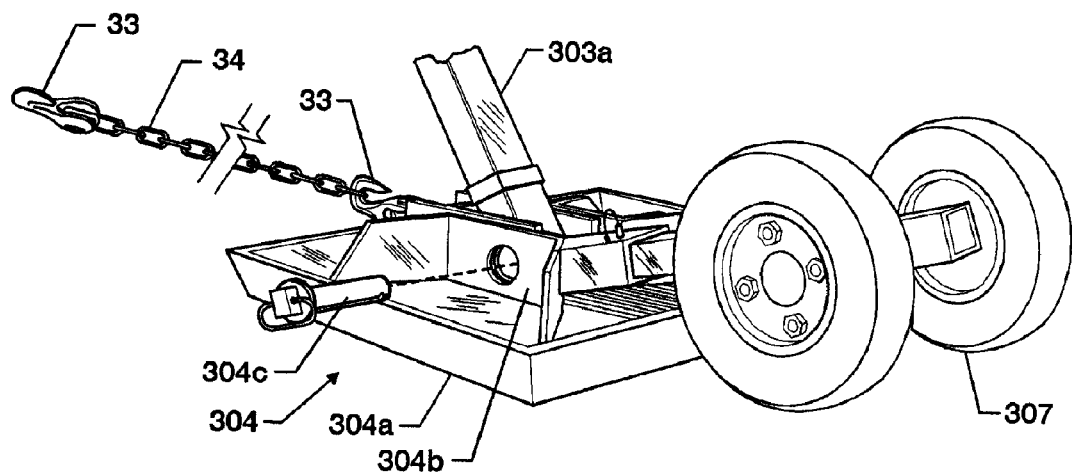
FIG. 18 is a schematic representation of a base of the fifth and sixth embodiments of the tree pusher, shown in FIGS. 16 and 17, respectively, made in accordance with the principles of the present invention.

As shown in FIG. 18, the base 304 comprises a first plate 304a, and a pair of second plates 304b. The second plates 304b are parallel to one another, and perpendicular to the first plate 304a. The foot 303a of the jack 303 is pivotally secured to the base 304 by a locking pin 304c. A hook 33 is fastened to the first plate 304a. One end of the chain 34 is connected to the hook 33, and the other end of the chain 34 to another hook 33.

Figure 19:
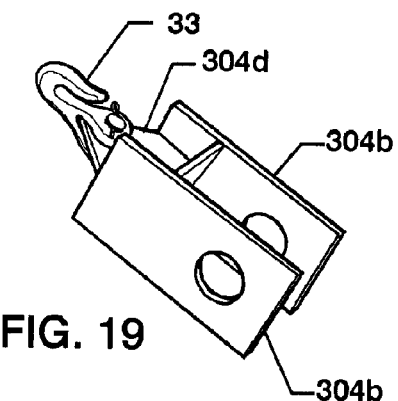
FIG. 19 is a schematic representation of an alternative arrangement for chaining the base of the tree pusher shown in FIGS. 16 and 17 to a tree that is to be felled.

An alternative arrangement for connecting the chain 34 to the base 304 is shown in FIG. 19. In this arrangement the hook 33 is attached to a third plate 304d that is fastened perpendicularly to the pair of second plates 304b, thereby connecting the base 304 indirectly to the tree 30 via the jack 303.

Figure 20:
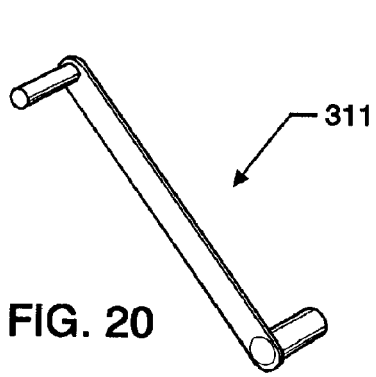
FIG. 20 is an enlarged view of a handle shown in FIG. 16, for manual operation of a jack shown in FIG. 16.
Figure 21:
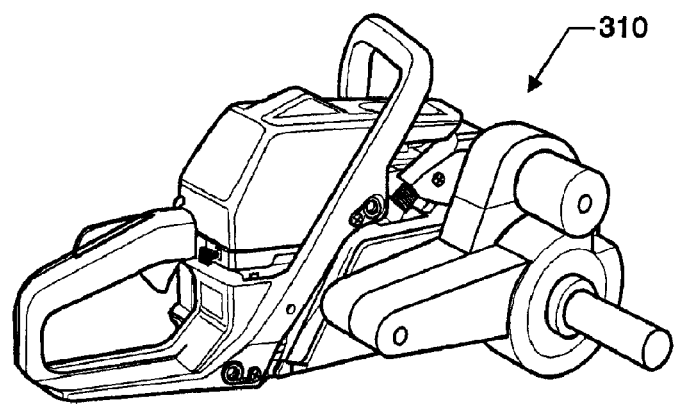
FIG. 21 is an enlarged view of a power head and gear box shown in FIG. 17, for powered operation of a jack shown in FIG. 17.

The components of the handle 311 used for manual operation of the jack 303 are shown in FIG. 20; components of the power head and gear box 310 used for powered operation thereof in FIG. 21. The power head and gear box 310 is manufactured by Simpson Winch Co., Portland, Oreg.

The jack 303 is a bevel-gear or worm-gear jack. The bevel-gear jack is fully disclosed and described in U.S. Pat. No. 3,069,180, which is hereby incorporated by reference. The worm-gear jack differs from the bevel-gear jack only by substitution of a worm gear for a bevel gear. For the purpose of the present invention, the bevel-gear arrangement is preferred. In either case, the construction of the gear box enables far greater loads, because the weight of the load is directed along the linear axis of the frame of the tree pusher.

Figures 22, 23, 24:
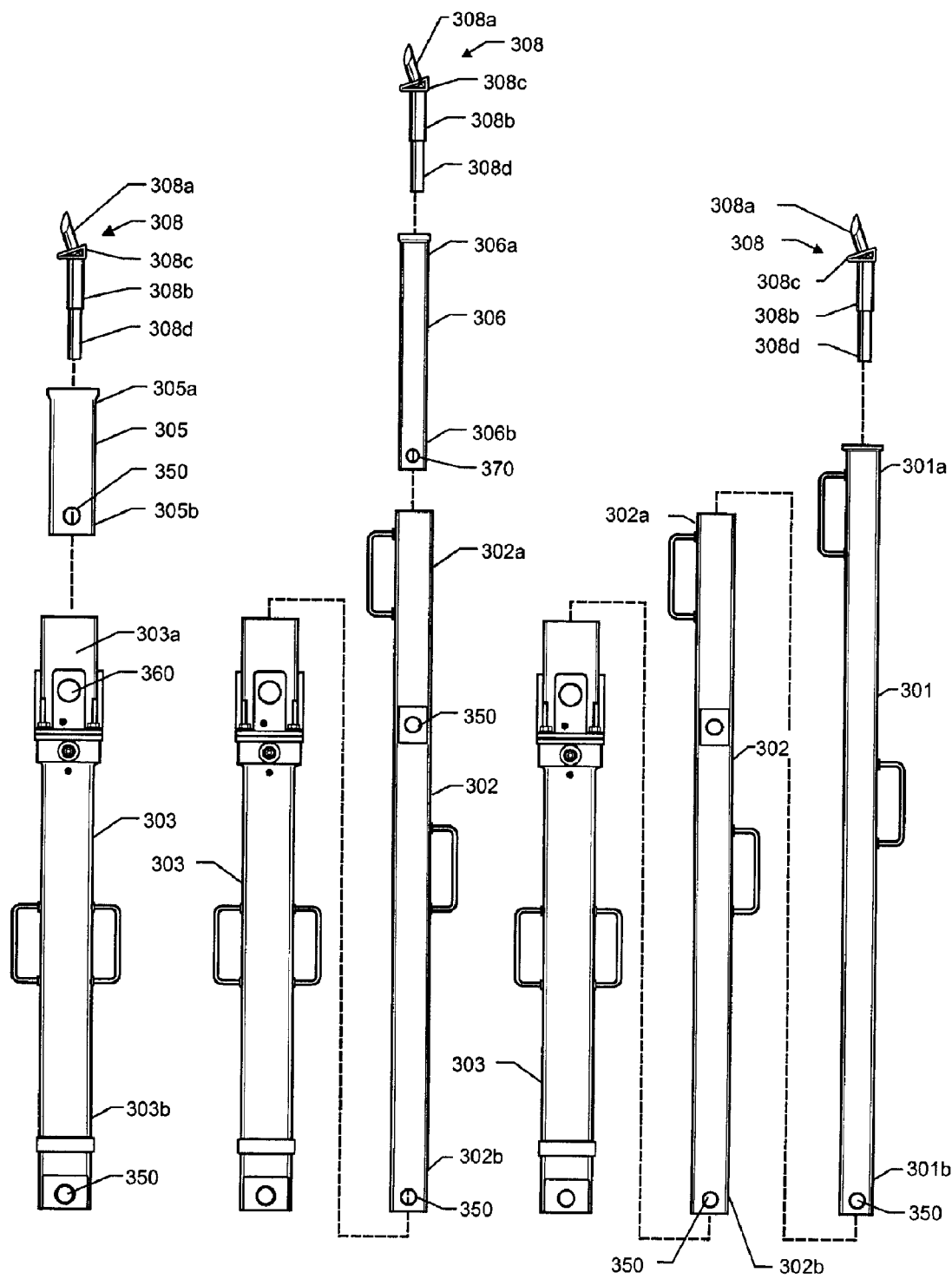
FIGS. 22-24 are schematic representations of components of the tree pusher shown in FIGS. 16 and 17, illustrating steps involved in assembling the tree pusher.

Assembly of the tree pushers 300 and 400, together with two other embodiments thereof, is illustrated by FIGS. 22-24.

The term "Diameter of Tree Breast-High" (DBH), defined as the diameter of the tree at the height of a breast of a man of average height, standing, is used to indicate the size of a tree. The tree size determines, to some considerable extent, the tools and/or machinery that are suitable for felling the tree.

For trees having a DBH greater than sixteen inches, the appropriate components of the tree pusher 300/400 are shown in FIG. 24. These components comprise the detachable pronged head 308, a head adapter 308d, the first tube 301, the second tube 302, and the jack 303. The pronged head 308 includes a plurality of prongs 308a for engaging the trunk of the tree, a shank 308b, and a triangular plate 308c connecting the prongs 308a to the shank 308b. Each prong 308a and the shank 308b define therebetween an oblique angle.

The tree pusher 300/400 is assembled as follows, it being understood that the order in which the recited operations are carried out is immaterial.

The shank 308b of the head 308 is attached to the head adapter 308d, and the head adapter 308d is disposed in a first end 301a of the first tube 301. A second end 301b of the first tube 301 is disposed in and fastened to a first end 302a of the second tube 302 by locking pins 304c disposed in openings 350. A second end 302b of the second tube 302 is disposed in and fastened to a first end 303a of the jack 303 by a locking pin 304c disposed in openings 350 and 360.

For trees having a DBH of sixteen inches or less, the first tube 301 is omitted and eliminated, as depicted in FIG. 23. By so doing, the length and height of the tree pusher are considerably reduced. A head-to-tube adapter 306 is used to replace the first tube 301, and to connect the head 308 to the second tube 302. The shank 308b of the head 308, and the head adapter 308d are disposed in a first end 306a of the head-to-second-tube adapter 306, and a second end 306b of the head-to-second-tube adapter 306 is disposed in and fastened to the first end 302a of the second tube 302, using a locking pin 304c through openings 350 and 370. The second end 302b of the second tube 302 is disposed in and connected to the first end 303a of the jack 303 as described previously with reference to FIG. 24.

In the components shown in FIG. 22, both first and second tubes 301 and 302 are omitted/eliminated, thereby further shortening the tree pusher. The shank 308b of the head 308, and the head adapter 308d are disposed in a first end 305a of a head-to-jack adapter 305. A second end 305b of the head-to-jack adapter 305 is disposed in and pinned to the first end 303a of the jack 303 via openings 350 and 360.

The components shown in FIG. 23, and on appropriate occasion those shown in FIG. 22, are used to lift trees that have accidentally fallen or been uprooted. Their use in this application is described below.

The assemblies shown in FIGS. 22-24 are pivotally mounted on the base 304 of the tree pusher by passing a locking pin 304c through openings in the plates 304b and the second end 303b of the jack 303, as shown in FIGS. 16, 17, and 19.

It sometimes happens that a tree falls, from natural causes such as a high wind, against an object such as a house or building. A particularly serious situation arises when the tree falls against an electrical power line. When an attempt is made to cut the fallen tree away from the power line, it frequently results in the power line's snapping dangerously about from the sudden release of tension.

The present invention provides a safe and effective method for dealing with such situations.

Two tree pushers 300 or 400 are used to lift the fallen tree. One tree pusher is positioned on one side of the tree, and the other tree pusher on the opposite side of the tree. The tree pushers are oriented perpendicularly to one another, thereby disposing each tree pusher at an angle of about forty-five degrees with the trunk of the tree. It will be apparent that, in this configuration, the tree pushers and the ground define a triangle. The base 304 of each tree pusher is chained to the base 304 of the other tree pusher, to stabilize and immobilize the bases 304. The jacks 303 are then used to lift the tree from the object against which it is leaning. Because the jacks 303 exert a continuous and even lifting force, the tree is gradually and smoothly lifted free of the object. When the object is an electrical power line, this gradual and continuous lifting of the tree therefrom prevents a sudden release of the power line from tension resulting from the weight of the tree, and thereby prevents a dangerous snapping about of the power line.

Once the tree has been lifted from the object that had been supporting the tree, it is necessary to remove the two tree pushers 300/400 from under the trunk of the tree. To do so, the combination shown in FIG. 23 is used. Two shortened tree pushers comprising the detachable head 308, the head-to-tube adapter 306, the second tube 302, and the jack 303, assembled and mounted on the base 304, are positioned on opposite sides of the tree as before, one below each of the tree pushers 300/400, and are used to lift the tree from the tree pushers 300/400. During this operation the bases 304 of the two shortened tree pushers are chained to one another. The trunk can then be cut down to the shortened tree pushers, whereupon it will usually be sufficiently light, the center of gravity now having shifted to near the base of the trunk where the heavy root ball is located, to right itself, thereby disengaging itself from the shortened tree pushers. The remaining stump can then be cut down as required.

In the event that what remains of the tree is still too heavy to be removed from the shortened tree pushers, the combination shown in FIG. 22 is used. Two very short tree pushers comprising the detachable head 308, the head-to-jack adapter 305, and the jack 303, assembled and mounted on the base 304, are utilized, one on either side of the tree as before, one below each of the shortened tree pushers, the two bases 304 being chained to each other, to lift the tree and remove the shortened tree pushers therefrom. If the very-short tree pushers cannot be taken out from under the tree, the trunk can be cut off near the base of the tree, causing the cut trunk to fall forward, disengaging the trunk from the very-short tree pushers.

Figures 25, 25A, 25B, 25C:
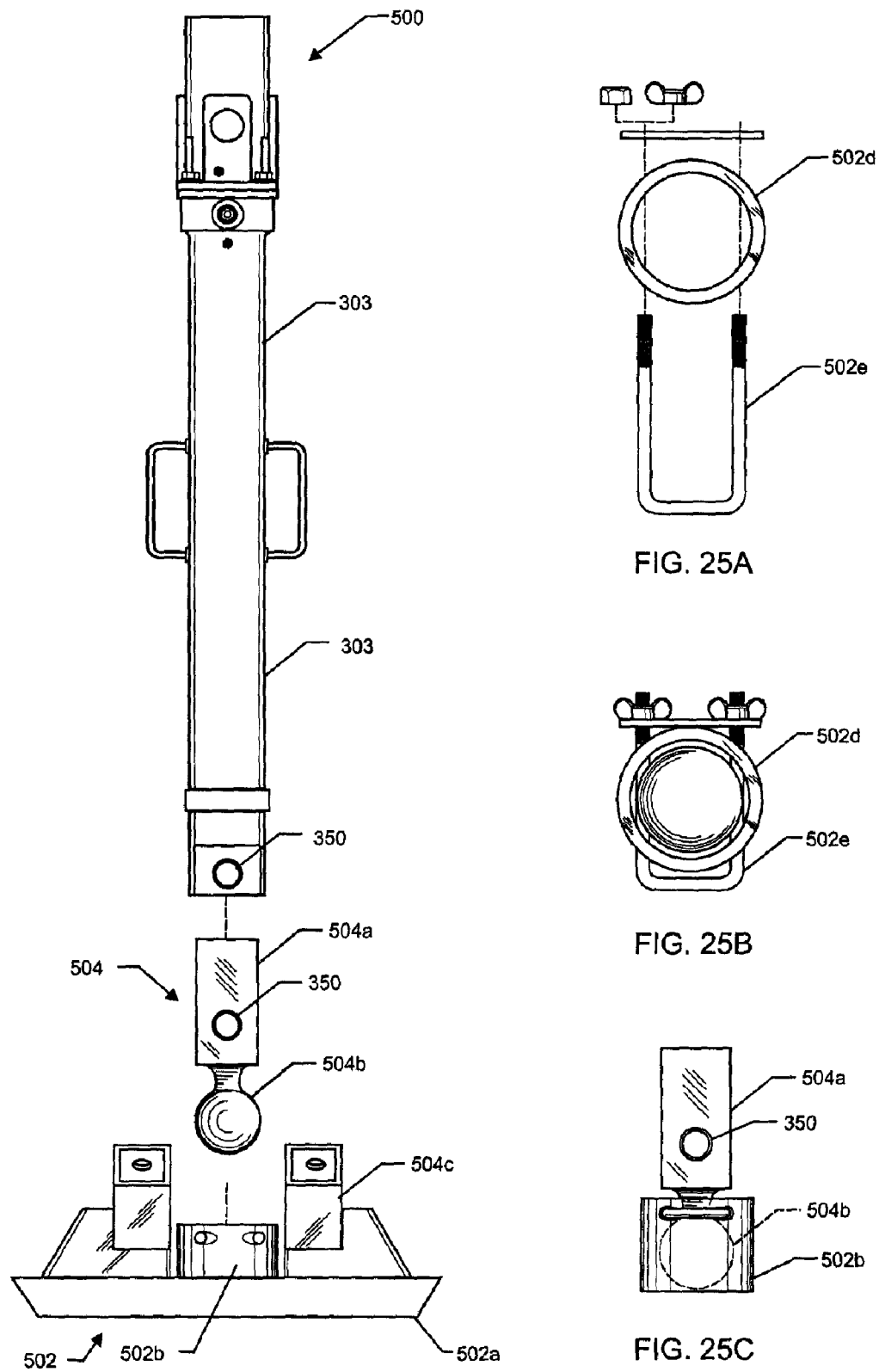
FIG. 25 is an isometric front view of a portion of a preferred seventh embodiment of a tree pusher, made in accordance with the principles of the present invention.
FIGS. 25A-25C are schematic representations of portions of the tree pusher shown in FIG. 25.

Reference is now made to FIG. 25, in which is shown a portion of a preferred seventh embodiment of a tree pusher, made in accordance with the principles of the present invention, and generally designated by the numeral 500.

The jack 303 is articulated to a ball assembly 504 comprising a face 504a and a ball 504b. A base 502 is constructed and arranged for pivotal and rotatable mounting thereto and thereon of the combination 500 of the jack 303 articulated to the ball assembly 504.

The base 502 comprises a first plate 502a on which are mounted a ball receptacle 502b and a pair of second plates 502c. The second plates 502c are constructed and arranged for connection to the wheels 307 shown in FIGS. 16 and 17.

As shown in FIGS. 25A and 25B, the ball receptacle 502b comprises a circular member 502d and a U-shaped member 502e. The circular member 502b is constructed and arranged for rotatable disposition therein of the ball 504b. The U-shaped member 502e utilizes nut-and-bolt connections to secure the circular member 502d to the U-shaped member 502e, to retain the ball 504b in the ball receptacle 502b.

Attachment of the ball assembly 504 to the base 502 is effected via a locking pin 304c disposed in and through openings 350 in the jack 303 and in the face 504a of the ball assembly 504.

The seventh embodiment of the tree pusher is completed by articulating the second tube 302, as shown in FIG. 23, or the first and second tubes 301 and 302, as shown in FIG. 24, and/or the head 308 and head adapter 309, as shown in FIGS. 22-24.

For an understanding and description of how the detachable head 308 is disposed in the first tube 301, reference is again made to FIGS. 12 and 13. The base 14, for disposition therein of the detachable head 12, is utilized for disposition of the detachable head 308 in the first tube 301, by welding the third plate 14d to the first end 14b of the tube 14a and to the first end 301a of the first tube 301.

Reference is now made to FIGS. 26-43, in which are shown various representations of the detachable head 308.

Figure 26:
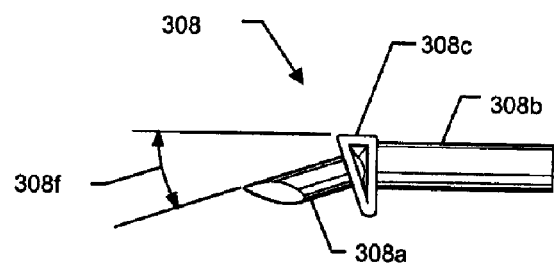
FIGS. 26-43 are schematic representations of components of the tree pusher shown in FIGS. 16-17 and 22-24.
Figure 27:
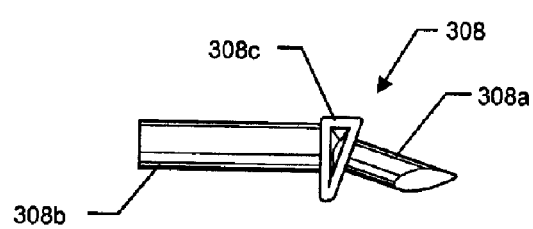

FIGS. 26 and 27 are side views of the detachable head 308, and the connecting plate 308c.

Figure 28:
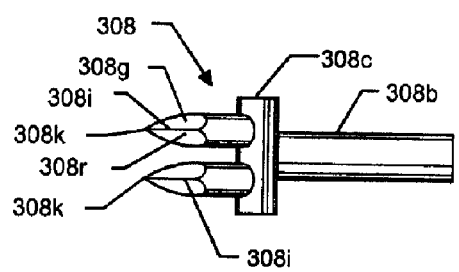
Figure 29:
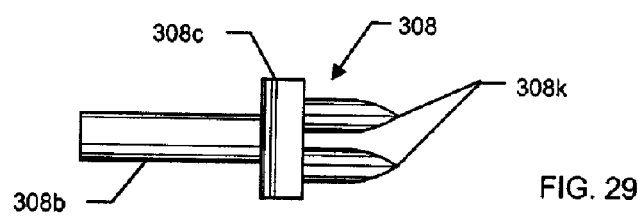

FIGS. 28 and 29 are bottom and top views, respectively, of the detachable head 308.

Figure 30:
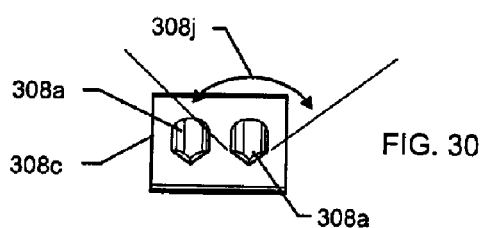
Figure 31:
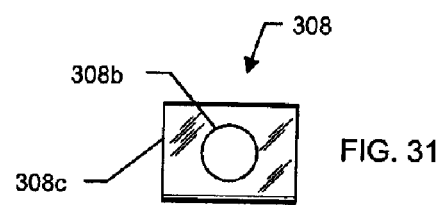

FIGS. 30 and 31 are end views of the detachable head 308.

Figure 32:
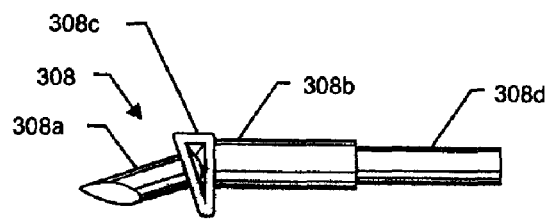
Figure 33:
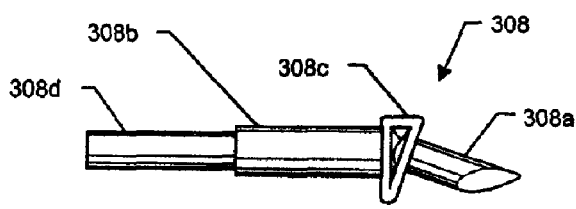

FIGS. 32 and 33 are side views of the detachable head 308 in which the shank 308b is extended by inclusion of a first shank extension 308d.

Figure 34:
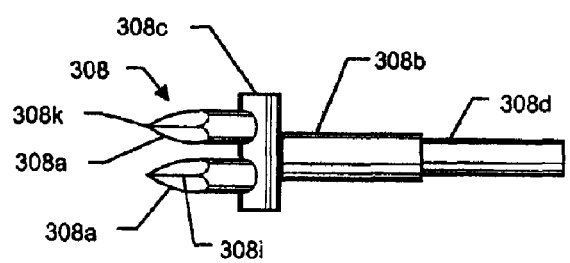
Figure 35:
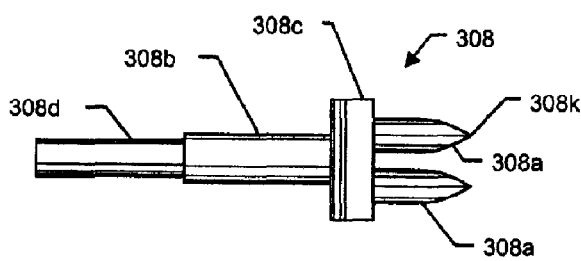

FIGS. 34 and 35 are bottom and top views, respectively, of the combination shown in FIGS. 32 and 33.

Figure 36:
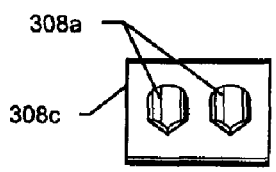
Figure 37:
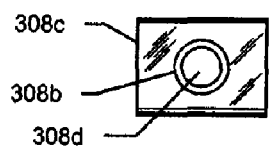

FIGS. 36 and 37 are end views of the combination shown in FIGS. 32-35.

Figure 38:
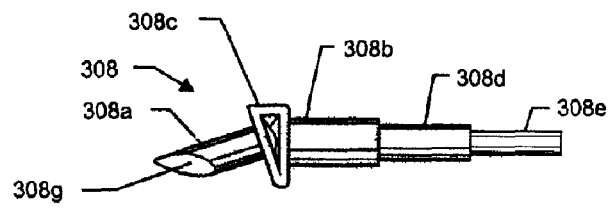
Figure 39:
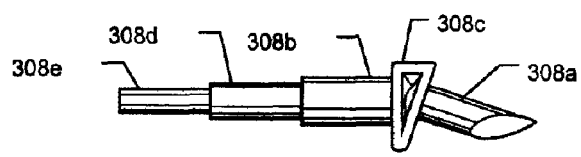

FIGS. 38 and 39 are side views of the detachable head 308 in combination with first and second shank extensions 308d and 308e.

Figure 40:
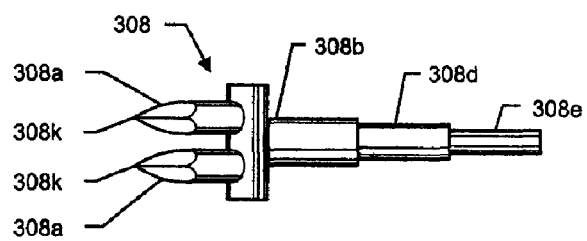
Figure 41:
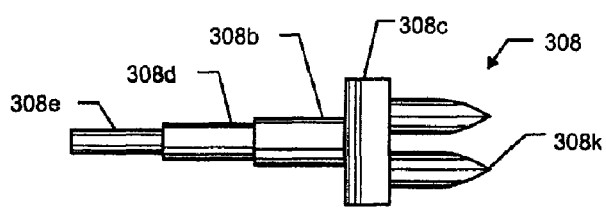

FIGS. 40 and 41 are bottom and top views, respectively, of the combination shown in FIGS. 38 and 39.

Figure 42:
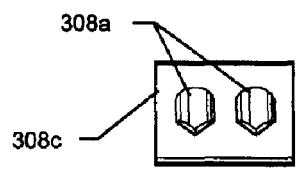
Figure 43:
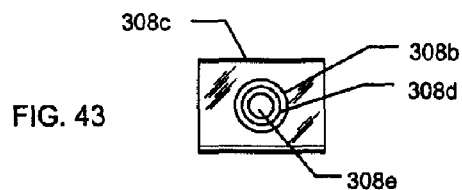

FIGS. 42 and 43 are end views of the combination shown in FIGS. 38-41.

The detachable head 308, and the combination of the detachable head 308 with the first and second shank extensions 308d and 308e, are in each case preferably fabricated as a single unit.

For an understanding and description of the geometry of the detachable head 308, reference is again made to FIGS. 26 and 28.

As best seen in FIG. 26, the prong 308a and the shank 308b define therebetween an angle 308f. The angle 308f is an acute angle. The magnitude of the angle 308f is from about fifteen to about thirty degrees. Preferably, the magnitude of the angle 308f is from about twenty to about twenty-five degrees.

As best seen in FIG. 28, each prong 308a comprises on its lower side two faces 308g and 308r which form a knife-edge 308i, and which define therebetween an exterior angle 308j. The faces 308g and 308r taper from wide to narrow in a direction away from the triangular plate 308c to form a pointed end 308k of the prong 308a.

Figure 44:
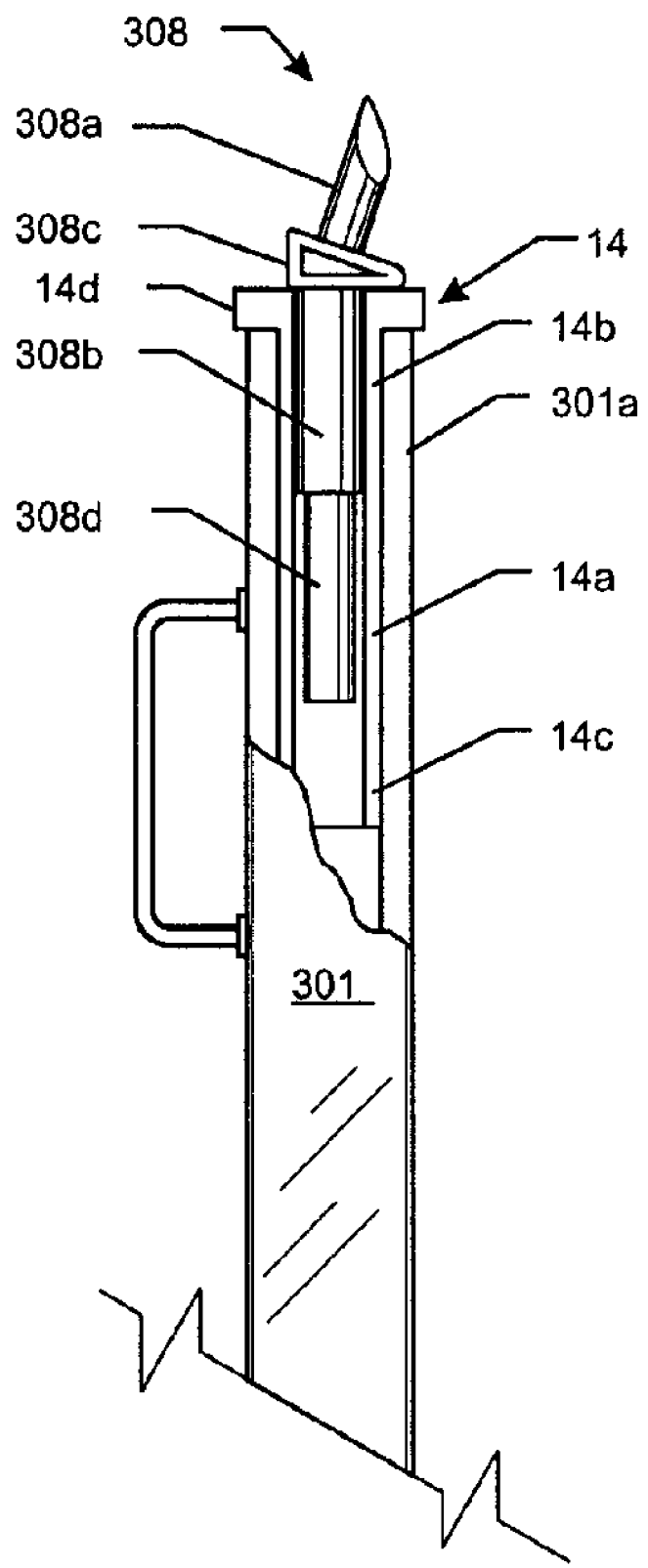
FIG. 44 is a schematic representation of a top portion of the tree pusher shown in FIGS. 16 and 17.

Reference is now made to FIG. 44, in which is shown the detachable head 308, with the first shank extension 308d, disposed in the base 14 inside the top portion 301a of the first tube 301.

Small, hollow, and/or rotten trees present a special problem. When such trees are felled using any of the tree pushers 100, 200, 2, 300, or 400, the trunk may split, break, or collapse. To provide for such an eventuality, a special belt, herein designated as a butt wrap, is wrapped around the tree and secured thereto just above the cut.

Figure 45:
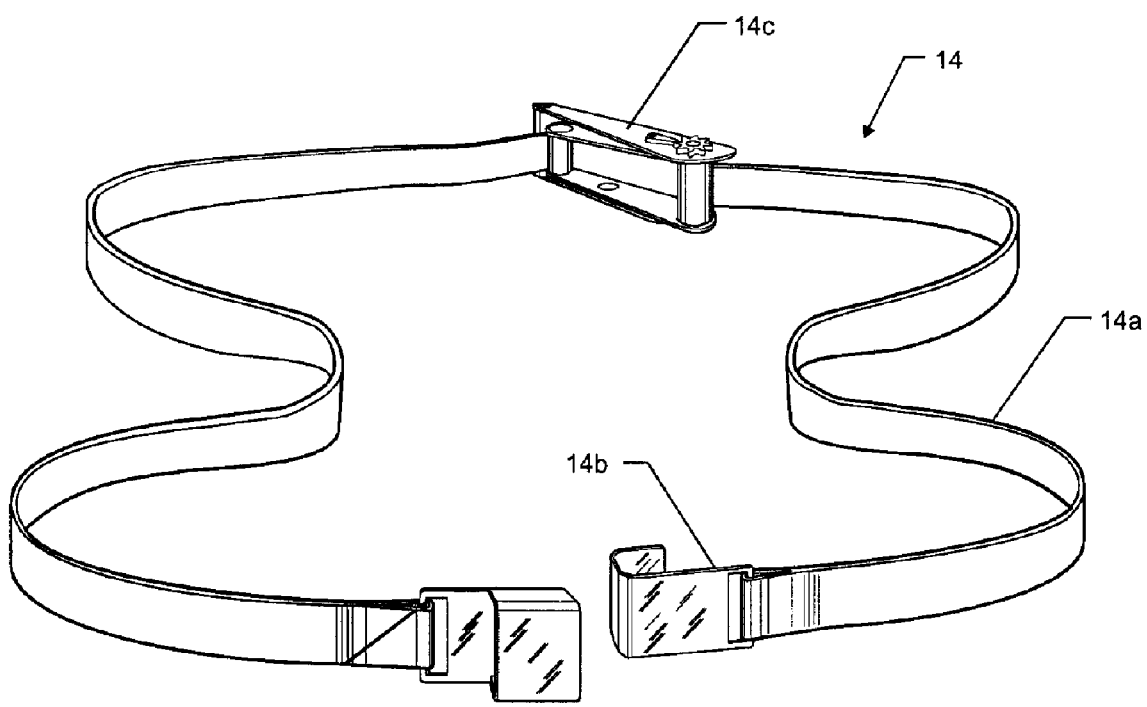
FIG. 45 is a schematic representation of a belt for use when felling small, hollow, or rotten trees.

A butt wrap is shown in FIG. 45, wherein it is generally designated by the numeral 14. The butt wrap 14 comprises a flexible member 14a which is wrapped around the tree, and which is secured to the tree by a first buckle 14b. The effective length of the butt wrap 14 and of the flexible member 14a is beneficially adjusted by a second buckle 14c.

Trees situated on soft terrain also present special problems. When using a tree pusher 100, 200, 2, 300, or 400 to fell such trees, a special device shown in FIGS. 46A-46E is used. A planar pad 46 is disposed under the base of the tree pusher. The pad 46 is provided with lateral strips 46b and 46c. A rope or cord 46a is threaded through an opening 46d in the pad 46, through an opening 46e in the lateral strip 46b, and through an opening (not shown) in the lateral strip 46c.

The device is manufactured as an Outrigger Pad by DICA Marketing Co., Panora, Iowa.

The tree pusher has the capability of developing a nominal, in-line force of 7500 pounds. The tree pusher is typically mounted against the tree to be felled and the soil with a forty-five degree included angle. On the base of the tree pusher, the 7500-pound force exerts both a downward force of 5775 pounds and a horizontal force of 5775 pounds. The downward force must be resisted by the soil. If the area of the base of the tree pusher is too small, the base will become buried in the soil.

How large should the base of the tree pusher be? The Farm Building Design book (Prentice Hall; 1961; page 482) lists the following safe loads:

| Soil Type | Safe Load | |
| --- | --- | --- |
| | (lb/sq ft) | (lb/sq in) |
| Silt or Loam | 1,000 | 6.9 |
| Sandy Loam | 2,000 | 13.8 |
| Firm Clay | 4,000 | 27 |
| Rock | 16-30,000 | 130-208 |

The "Safe Load" data in the table above are nominal and conservative; i.e., small relative to temporary loads, and thus will indicate footing sizes that are most appropriate for buildings that will be in place for many years. Therefore, the footing sizes calculated for temporary loads like those of a tree pusher will be over-sized.

For "loam" and "firm-clay" soil, the calculated footing sizes are 837 and 214 square inches (sq in), respectively. In actual tree-cutting operations on ground that is "dry to wet" but not muddy, experience has shown these footing areas can be reduced by approximately eighty percent without the foot sinking excessively into the soil. Extremely wet or muddy conditions will obviously result in the need for an increase in the footing area. Footings that have small areas; i.e., areas of four to twenty sq in of ground contact, will not keep a tree jack footing on top of the soil surface.

As mentioned above, a jack that exerts 7500 pounds of in-line force will be exerting a force of 5775 pounds in a horizontal direction also, when the included angle is at forty-five degrees with respect to the soil. There is a frictional force between a steel plate and the soil. This force resists the movement of the tree jack foot in a direction away from the tree. Data on the coefficients of sliding friction (cfs) were reported in *Soil Dynamics in Tillage and Traction* [USDA ARS Agriculture Handbook No. 316, 1967; FIG. 105 (page 165) and FIG. 109 (page 168)]. For steel plates that were one to two feet in length, the csf's varied from 0.3 to 0.7 for soil moistures up to twenty-eight percent. The nominal cfs value was about 0.5. This cfs value of 0.5 indicates that about half; i.e., 2888 pounds, of the horizontal force can be resisted by the soil. However, the remaining 2888 pounds of horizontal force must also be resisted. If short, small-diameter; i.e., ⅜ inch pins are added to the bottom of a plate, each pin would be expected to resist only a minimal force; i.e., five to twenty pounds each. The remainder of the horizontal force; i.e., more than 2000 pounds, must be resisted by something else. In the case of the present invention, this force is resisted by a 5/16 inch high-tensile-strength chain that is wrapped around the trunk of the tree that is to be cut.

While certain specific embodiments and details have been described in order to illustrate the present invention, it will be apparent that many modifications are possible within the scope of the basic concept of the invention.

What is claimed is:

1. A tree pusher for felling a tree, the tree pusher comprising:
    a base having a bottom portion comprising a planar member;
    a frame mounted on the base;
    means for urging the frame against the tree; and
    means, directly connected to the planar member, for connecting the base of the tree pusher to the tree, to stabilize and immobilize the base while the tree is being felled; wherein the frame comprises first, second, third, and fourth rectangular tubes having first and second ends, the first tube being pivotally connected to the base, the second tube being disposed in the first tube, the third tube being constructed and arranged to slide over the second tube, and the fourth tube being constructed and arranged to be inserted in and pinned to the third tube: the tree pusher further comprises a detachable head constructed and arranged to be disposed in the fourth tube, to attach the detachable head to a trunk of the tree, and to detach the detachable head from the frame of the tree pusher and remain attached to the trunk of the tree when the tree falls; and the tree pusher further comprises a screw-transmission trailer jack which is attached to the frame, which is extendable, and which is capable of bearing the weight of a large tree, for providing means for urging the frame and thereby the head of the tree pusher against the trunk of the tree.

2. The tree pusher of claim 1, wherein the jack is pivotally mounted on the base of the tree pusher, and the tree pusher further comprises:
    a base for the detachable head, the base for the head being fastened to the second end of the second tube, and providing means for movable disposition of the detachable head in the second tube.

* * * * *